(12) United States Patent
Oikawa et al.

(10) Patent No.: US 11,636,817 B2
(45) Date of Patent: Apr. 25, 2023

(54) LIQUID CRYSTAL DEVICE AND ELECTRONIC APPARATUS

(71) Applicant: SEIKO EPSON CORPORATION, Tokyo (JP)

(72) Inventors: Hiroyuki Oikawa, Chitose (JP); Masahito Yoshii, Chitose (JP); Shinta Misawa, Azumino (JP); Masakazu Nishida, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/824,863

(22) Filed: May 25, 2022

(65) Prior Publication Data

US 2022/0383831 A1 Dec. 1, 2022

(30) Foreign Application Priority Data

May 27, 2021 (JP) .............................. JP2021-089065

(51) Int. Cl.
 *G09G 3/36* (2006.01)
 *G02F 1/1339* (2006.01)
 (Continued)

(52) U.S. Cl.
 CPC ......... *G09G 3/3614* (2013.01); *G02F 1/1339* (2013.01); *G02F 1/134309* (2013.01);
 (Continued)

(58) Field of Classification Search
 CPC ............... G09G 3/3614; G09G 3/3648; G09G 2300/0426; G09G 2300/0413;
 (Continued)

(56) References Cited

U.S. PATENT DOCUMENTS

| 2008/0055529 | A1 | 3/2008 | Shirasaka et al. |
| 2010/0156868 | A1* | 6/2010 | Hirayama ............ G09G 3/3677 345/208 |

(Continued)

FOREIGN PATENT DOCUMENTS

| JP | 2007-025530 | 2/2007 |
| JP | 2008-058497 | 3/2008 |

(Continued)

*Primary Examiner* — Dmitriy Bolotin
(74) *Attorney, Agent, or Firm* — JCIPRNET

(57) ABSTRACT

In a liquid crystal device, a first pixel area is provided in a pixel area of a first substrate, and a second pixel area is provided between the first pixel area and a seal material. The first pixel area has a first pixel electrode to which an image signal is applied, the image signal having a potential alternately switching between a positive polarity and a negative polarity with reference to a first central potential. The second pixel area includes a second pixel electrode to which a first driving potential is applied, the first driving potential having a potential alternately switching between a positive polarity and a negative polarity with reference to a second central potential, the first central potential and the second central potential having a potential difference set therebetween. Therefore, ionic impurities can be efficiently swept from the first pixel area to the second pixel area.

15 Claims, 14 Drawing Sheets

(51) Int. Cl.
*G02F 1/1343* (2006.01)
*G02F 1/1337* (2006.01)

(52) U.S. Cl.
CPC ..... *G09G 3/3648* (2013.01); *G02F 1/133742* (2021.01); *G02F 1/133749* (2021.01); *G02F 1/133788* (2013.01); *G09G 2300/0426* (2013.01)

(58) Field of Classification Search
CPC ................. G09G 3/006; G09G 3/3655; G09G 2320/0204; G02F 1/1339; G02F 1/134309; G02F 1/133742; G02F 1/133749; G02F 1/133788
See application file for complete search history.

(56) References Cited

U.S. PATENT DOCUMENTS

| | | | |
|---|---|---|---|
| 2013/0113780 A1* | 5/2013 | Miyatake | G02F 1/134336 345/212 |
| 2017/0116936 A1 | 4/2017 | Nishida | |
| 2019/0355319 A1* | 11/2019 | Yatabe | G09G 3/3614 |
| 2022/0383831 A1* | 12/2022 | Oikawa | G02F 1/1339 |

FOREIGN PATENT DOCUMENTS

| | | |
|---|---|---|
| JP | 2017-078792 | 4/2017 |
| JP | 2018-180428 | 11/2018 |

\* cited by examiner

LIQUID CRYSTAL DEVICE AND ELECTRONIC APPARATUS

The present application is based on, and claims priority from JP Application Serial Number 2021-089065, filed May 27, 2021, the disclosure of which is hereby incorporated by reference herein in its entirety.

BACKGROUND

1. Technical Field

The present disclosure relates to a liquid crystal device and an electronic apparatus.

2. Related Art

A liquid crystal device used in an electronic apparatus such as a projection-type display device includes a first substrate, a second substrate bonded to the first substrate via a seal material, and a liquid crystal layer such as a liquid crystal layer is disposed inside the seal material. In such a liquid crystal device, when ionic impurities of the liquid crystal layer are unevenly distributed within a pixel area, light modulation characteristics are deteriorated in the area where the ionic impurities are unevenly distributed. Therefore, there has been proposed a technique of providing an electrode in a peripheral area between a pixel area of a first substrate and a seal material, and applying a fixed potential to the electrode to sweep out ionic impurities from the pixel area toward the electrode (see JP 2018-180428 A).

In general, in the pixel area, a display area in which display pixels directly contributing to display are arrayed, and a dummy pixel area located between the display area and the seal material are present, and thus, the electrode in the peripheral area and the display area are separated from each other in the technique described in JP 2018-180428 A. Therefore, there is a problem that the ionic impurities cannot be efficiently swept from the pixel area that directly contributes to display.

SUMMARY

In order to solve the above problems, an aspect of a liquid crystal device according to the present disclosure includes a first substrate having a pixel area, a second substrate having a common electrode to which a common potential is applied, a seal material provided between the first substrate and the second substrate, and a liquid crystal layer disposed in a space surrounded by the seal material, wherein the pixel area includes a first pixel area having a first pixel electrode to which an image signal is applied, the image signal having a potential alternately switching between a positive polarity and a negative polarity with reference to a first central potential, and, between the first pixel area and the seal material, a second pixel area having a second pixel electrode to which a first driving potential is applied, the first driving potential having a potential alternately switching between a positive polarity and a negative polarity with reference to a second central potential, the first central potential and the second central potential having a potential difference set therebetween.

An aspect of an electronic apparatus according to the present disclosure includes a first liquid crystal device on which light in a first wavelength range is incident, a second liquid crystal device on which light in a second wavelength range having a longer wavelength than that of the first wavelength range is incident, a third liquid crystal device on which light in a third wavelength range having a longer wavelength than that of the second wavelength range is incident, and a synthetic optical system configured to synthesize light in the first wavelength range emitted from the first liquid crystal device, light in the second wavelength range emitted from the second liquid crystal device, and light in the third wavelength range emitted from the third liquid crystal device, wherein the first liquid crystal device includes a first substrate having a pixel area, a second substrate having a common electrode to which a common potential is applied, a seal material provided between the first substrate and the second substrate, and a liquid crystal layer disposed in a space surrounded by the seal material, the pixel area includes a first pixel area having a first pixel electrode to which an image signal is applied, the image signal having a potential alternately switching between a positive polarity and a negative polarity with reference to a first central potential, and, between the first pixel area and the seal material, a second pixel area having a second pixel electrode to which a first driving potential is applied, the first driving potential having a potential alternately switching between a positive polarity and a negative polarity with reference to a second central potential, the first central potential and the second central potential having a potential difference set therebetween.

Another aspect of the electronic apparatus according to the present disclosure includes a first liquid crystal device on which light in a first wavelength range is incident, a second liquid crystal device on which light in a second wavelength range having a longer wavelength than that of the first wavelength range is incident, a third liquid crystal device on which light in a third wavelength range having a longer wavelength than that of the second wavelength range is incident, and a synthetic optical system configured to synthesize light in the first wavelength range emitted from the first liquid crystal device, light in the second wavelength range emitted from the second liquid crystal device, and light in the third wavelength range emitted from the third liquid crystal device, wherein the first liquid crystal device, and the second liquid crystal device each include a first substrate having a pixel area, a second substrate having a common electrode to which a common potential is applied, a seal material provided between the first substrate and the second substrate, and a liquid crystal layer disposed in a space surrounded by the seal material, the pixel area includes a first pixel area having a first pixel electrode to which an image signal is applied, the image signal having a potential alternately switching between a positive polarity and a negative polarity with reference to a first central potential, and, between the first pixel area and the seal material, a second pixel area having a second pixel electrode to which a first driving potential is applied, the first driving potential having a potential alternately switching between a positive polarity and a negative polarity with reference to a second central potential, the first central potential and the second central potential having a potential difference set therebetween.

BRIEF DESCRIPTION OF THE DRAWINGS

FIG. 7 is an explanatory diagram of an image signal applied to a first pixel electrode illustrated in FIG. 1 and the like.

DESCRIPTION OF EXEMPLARY EMBODIMENTS

Figure 1:
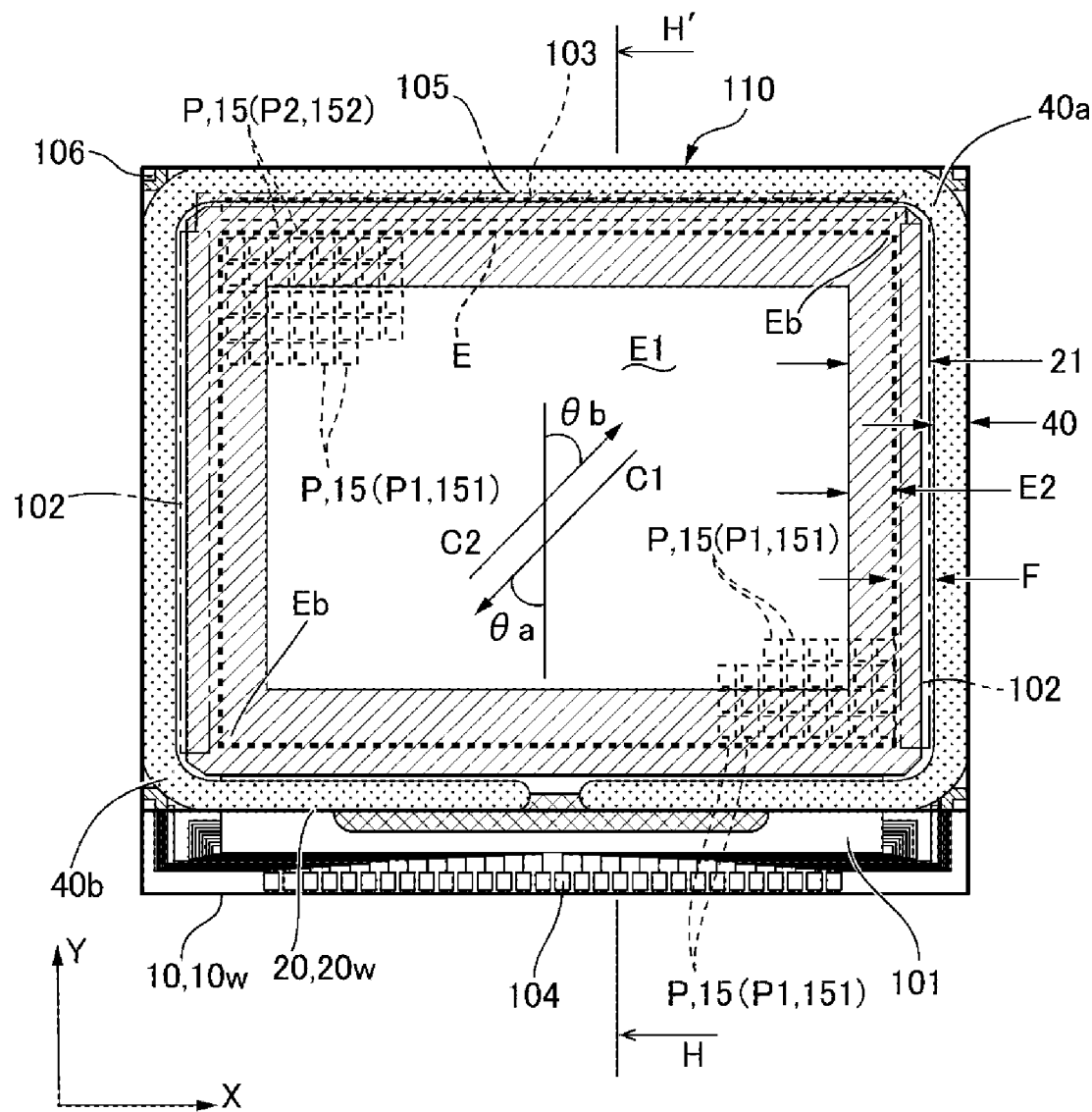
FIG. 1 is an explanatory diagram illustrating a plan view configuration of a liquid crystal device of a display device according to a first exemplary embodiment of the present disclosure.

Exemplary embodiments of the present disclosure will be described below with reference to the accompanying drawings. Note that, in the drawings referred to below, parts described are illustrated in an enlarged or reduced state as appropriate, so that those parts can be easily recognized. Further, in the description below, when describing films or the like formed at a first substrate 10, an upper layer refers to a side opposite to a substrate body 10w of the first substrate 10, and a lower layer refers to a side of the substrate body 10w. When describing films or the like formed at a second substrate 20, an upper layer refers to a side opposite to a substrate body 20w of the second substrate 20, and a lower layer refers to a side of the substrate body 20w. Further, plan view means a state as viewed from a normal direction with respect to the first substrate 10 and the second substrate 20. Furthermore, in the description below, as an example of a transistor, the active matrix type liquid crystal device 110, which is provided with a thin film transistor (TFT) 30 as a pixel switching element, will be mainly described. Such a liquid crystal device 110 can be suitably used as a light valve of a projection-type display device, which will be described below, or the like.

1. First Exemplary Embodiment 1-1. Overall Configuration of Liquid Crystal Device 110

Figure 2:
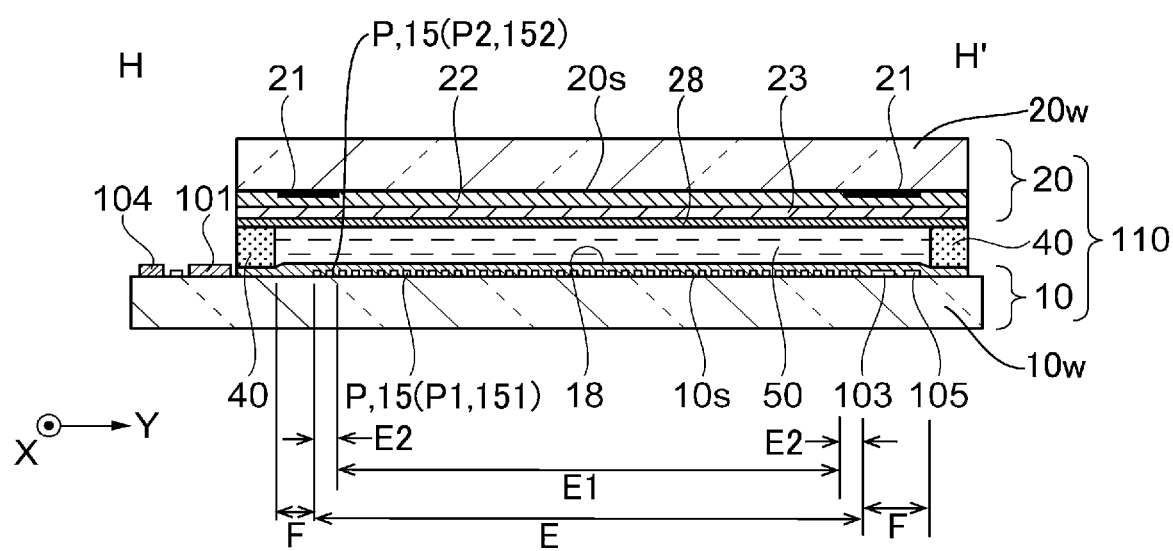
FIG. 2 is a cross-sectional view schematically illustrating an H-H' cross section of the liquid crystal device illustrated in FIG. 1.

FIG. 1 is an explanatory diagram illustrating a plan view configuration of the liquid crystal device 110 according to a first exemplary embodiment of the present disclosure. FIG. 2 is a cross-sectional view schematically illustrating an H-H' cross section of the liquid crystal device 110 illustrated in FIG. 1.

The liquid crystal device 110 illustrated in FIGS. 1 and 2 is mounted in a direct-view type or projection-type display device along with an optical element or the like. The liquid crystal device 110 includes the first substrate 10, and the second substrate 20 facing the first substrate 10, and the first substrate 10 and the second substrate 20 are bonded together via a frame-shaped seal material 40 provided between the first substrate 10 and the second substrate 20. Between the first substrate 10 and the second substrate 20, a liquid crystal layer 50 is disposed inside the seal material 40. The first substrate 10 includes the substrate body 10w formed of a transmissive substrate such as a quartz substrate or a glass substrate, and the substrate body 10w to a first alignment film 18 correspond to the first substrate 10. The second substrate 20 includes the substrate body 20w formed of a transmissive substrate such as a quartz substrate or a glass substrate, and the substrate body 20w to a second alignment film 28 correspond to the second substrate 20.

The first substrate 10 is larger than the second substrate 20, and the seal material 40 is disposed along an outer edge of the second substrate 20. The liquid crystal layer 50 is formed by a liquid crystal material having positive or negative dielectric anisotropy. The seal material 40 is formed from an adhesive such as a thermosetting or ultraviolet-curable epoxy resin, and includes a spacer (not illustrated) for maintaining a constant spacing between the first substrate 10 and the second substrate 20.

A pixel area E is provided in an area surrounded by the seal material 40, and a plurality of pixels P are arrayed in a matrix manner in the pixel area E. The second substrate 20 is provided with a partition portion 21 extending so as to overlap with a peripheral area F between the seal material 40 and the pixel area E in plan view, and the partition portion 21 surrounds a periphery of the pixel area E in plan view. The partition portion 21 is configured by a light shielding layer made from metal, metal oxide, or the like. The light-shielding layer may be configured as a black matrix that overlaps with boundary portions of the adjacent pixels P in plan view, with respect to the second substrate 20.

On a side of the one surface 10s of the first substrate 10, which faces the second substrate 20, a plurality of terminals 104 are arrayed along one side outside the seal material 40, and a data line driving circuit 101 is provided between the terminals 104 and the pixel area E. On the side of the one surface 10s of the first substrate 10, a scanning line driving circuit 102 is provided outside the pixel area E along each of two sides adjacent to a side on which the terminals 104 are arrayed, and an inspection circuit 103 and a wiring line 105 are provided along a side opposite to the side on which the terminals 104 are arrayed. The data line driving circuit 101 and each of the plurality of wiring lines coupled to the scanning line driving circuits 102 are coupled to the plurality of terminals 104. Hereinafter, a direction in which the terminals 104 are arrayed is referred to as an X-axis direction, and a direction orthogonal to the X-axis direction is referred as a Y-axis direction.

A pixel electrode 15 arranged for each of the plurality of pixels P and the first alignment film 18 covering the pixel electrodes 15 are provided on the side of the one surface 10s of the first substrate 10. In addition, although not illustrated, a pixel switching element, wiring lines, and the like, which will be described below, are provided on the one surface 10s side of the first substrate 10. The pixel electrode 15 is formed from a light-transmissive conductive film, such as indium tin oxide (ITO).

The partition portion 21, a flattening film 22 covering the partition portion 21, a common electrode 23 covering the flattening film 22, and the second alignment film 28 covering the common electrode 23 are provided on a one surface 20s side of the second substrate 20 that faces the first substrate 10. The partition portion 21 overlaps with the scanning line driving circuit 102 and the inspection circuit 103 in plan view. Therefore, an erroneous operation due to light is prevented by shielding light that may be incident on the scanning line driving circuit 102 and the like from the second substrate 20 side. In addition, the partition portion 21 prevents unwanted stray light from being incident on the pixel area E to suppress deterioration of contrast of a displayed image. The flattening film 22 is formed from an inorganic material, such as silicon oxide, for example. The common electrode 23 is formed of ITO or the like, and is electrically coupled to the terminal 104 via a vertical conduction portion 106 provided between the first substrate 10 and the second substrate 20, and wiring provided at the first substrate 10.

The first alignment film 18 and the second alignment film 28 are selected based on an optical design of the liquid crystal device 110. The first alignment film 18 and the second alignment film 28 are each formed of an inorganic alignment film including an inorganic material, such as silicon oxide (SiOx) formed by a vapor-phase growth method such as vapor deposition. In this case, the first alignment film 18 and the second alignment film 28 align liquid crystal molecules having negative dielectric anisotropy to be substantially vertical. The first alignment film 18 and the second alignment film 28 may be formed of an organic alignment film, such as polyimide having a surface that has been rubbed. In this case, the organic alignment film aligns liquid crystal molecules having positive dielectric anisotropy to be substantially horizontal.

The liquid crystal device 110 configured in this way is of a transmissive type. Thus, the liquid crystal device 110 is configured as a liquid crystal device in a normally-white mode in which transmittance of the pixel P is maximized in a voltage not applied state or in a normally-black mode in which the transmittance of the pixel P is minimum in a voltage not applied state, depending on an optical design of each of polarization elements disposed on a light incident side and a light-emitting side with respect to the liquid crystal panel 110. In the following description, an example is described in which the optical design of the normally-black mode is applied, using inorganic alignment films as the first alignment film 18 and the second alignment film 28, and using a liquid crystal material having negative dielectric anisotropy for the liquid crystal layer 50.

1-2. Electrical Configuration of Liquid Crystal Device 110

Figure 3:
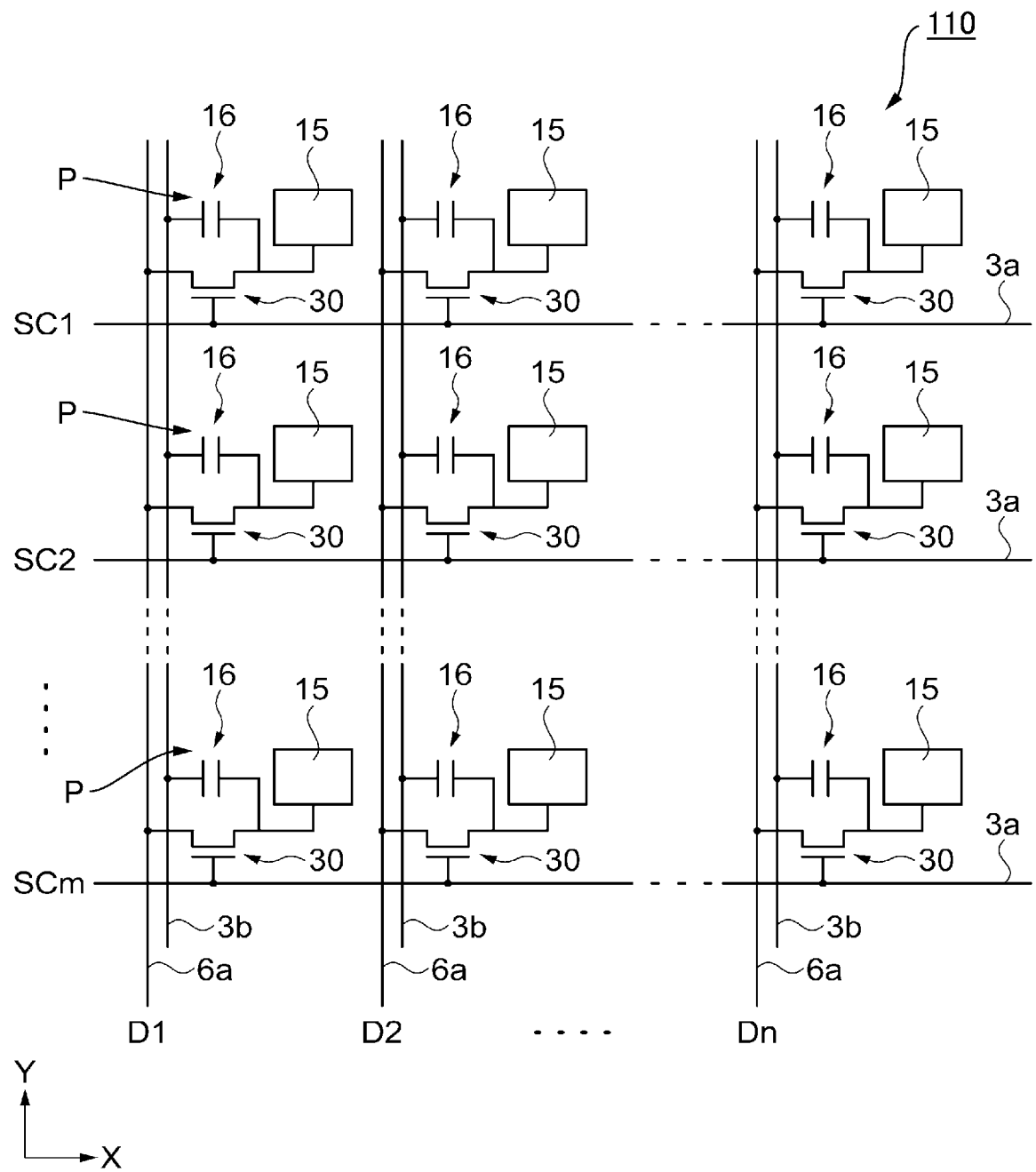
FIG. 3 is an equivalent circuit diagram illustrating an electrical configuration of the liquid crystal device illustrated in FIG. 1.

FIG. 3 is an equivalent circuit diagram illustrating an electrical configuration of the liquid crystal device 110 illustrated in FIG. 1. As illustrated in FIG. 3, the liquid crystal device 110 includes at least a plurality of scanning lines 3a extending in the X-axis direction in the pixel area E, and a plurality of data lines 6a extending in the Y-axis direction. The scanning line 3a and the data line 6a are in an insulated state from each other in the first substrate 10. The first substrate 10 includes capacitor lines 3b that extend along the data lines 6a. In addition, the pixel P is provided to correspond to each of intersections between the plurality of scanning lines 3a and the plurality of data lines 6a. Each of the plurality of pixels P includes the pixel electrode 15, the TFT 30, and a storage capacitor 16. The scanning line 3a is electrically coupled to a gate of the TFT 30, and the data line 6a is electrically coupled to a source of the TFT 30. The pixel electrode 15 is electrically coupled to a drain of the TFT 30.

The data lines 6a are coupled to the data line driving circuit 101 illustrated in FIG. 1, and supply image signals D1, D2, . . . , and Dn supplied from the data line driving circuit 101 to each of the pixels P. The scanning lines 3a are coupled to the scanning line driving circuit 102 illustrated in FIG. 1, and sequentially supply scanning signals SC1, SC2, . . . , and SCm supplied from the scanning line driving circuit 102 to each of the pixels P. The image signals D1 to Dn supplied from the data line driving circuit 101 to the data lines 6a may be line-sequentially supplied in this order, or may be supplied to the plurality of data lines 6a adjacent to one another per group. The scanning line driving circuit 102 line-sequentially supplies the scan signals SC1 to SCm to the scanning lines 3a, at predetermined timings.

In the liquid crystal device 110, during a period in which the TFT 30, which is a switching element, is turned on by an input of the scanning signals SC1 to SCm, the image signals D1 to Dn supplied from the data lines 6a are written into the pixel electrodes 15 at predetermined timings. The image signals D1 to Dn of a predetermined level written into the liquid crystal layer 50 via the pixel electrodes 15 are maintained for a certain period between the pixel electrodes 15 and the common electrode 23, which are arranged to face the pixel electrodes 15 being intervened by the liquid crystal layer 50. The frequency of the image signals D1 to Dn is 60 Hz, for example. In the present exemplary embodiment, to inhibit the image signals D1 to Dn maintained between the pixel electrodes 15 and the liquid crystal layer 50 from leaking, the storage capacitor 16 is coupled in parallel with a liquid crystal capacitor formed between the pixel electrode 15 and the common electrode 23. The storage capacitor 16 is provided between the drain of the TFT 30 and the capacitor line 3b.

The data lines 6a are coupled to the inspection circuit 103 illustrated in FIG. 1, and the inspection circuit 103 is used to verify operational defects and the like of the liquid crystal device 110 by detecting the above-described image signals D1 to Dn in a manufacturing process of the liquid crystal device 110. Note that in FIG. 1, the data line driving circuit 101, the scanning line driving circuit 102, and the inspection circuit 103 are illustrated as peripheral circuits formed on the outer side of the pixel area E. However, a sampling circuit that is configured to sample the above-described image signals and supply the sampled image signals to the data lines 6a, a pre-charge circuit that is configured to supply pre-charge signals of a predetermined voltage level to the data lines 6a in advance of the above-described image signals D1 to Dn, and the like may be provided as the peripheral circuits in some cases.

1-3. Configuration of Pixel P

Figure 4:
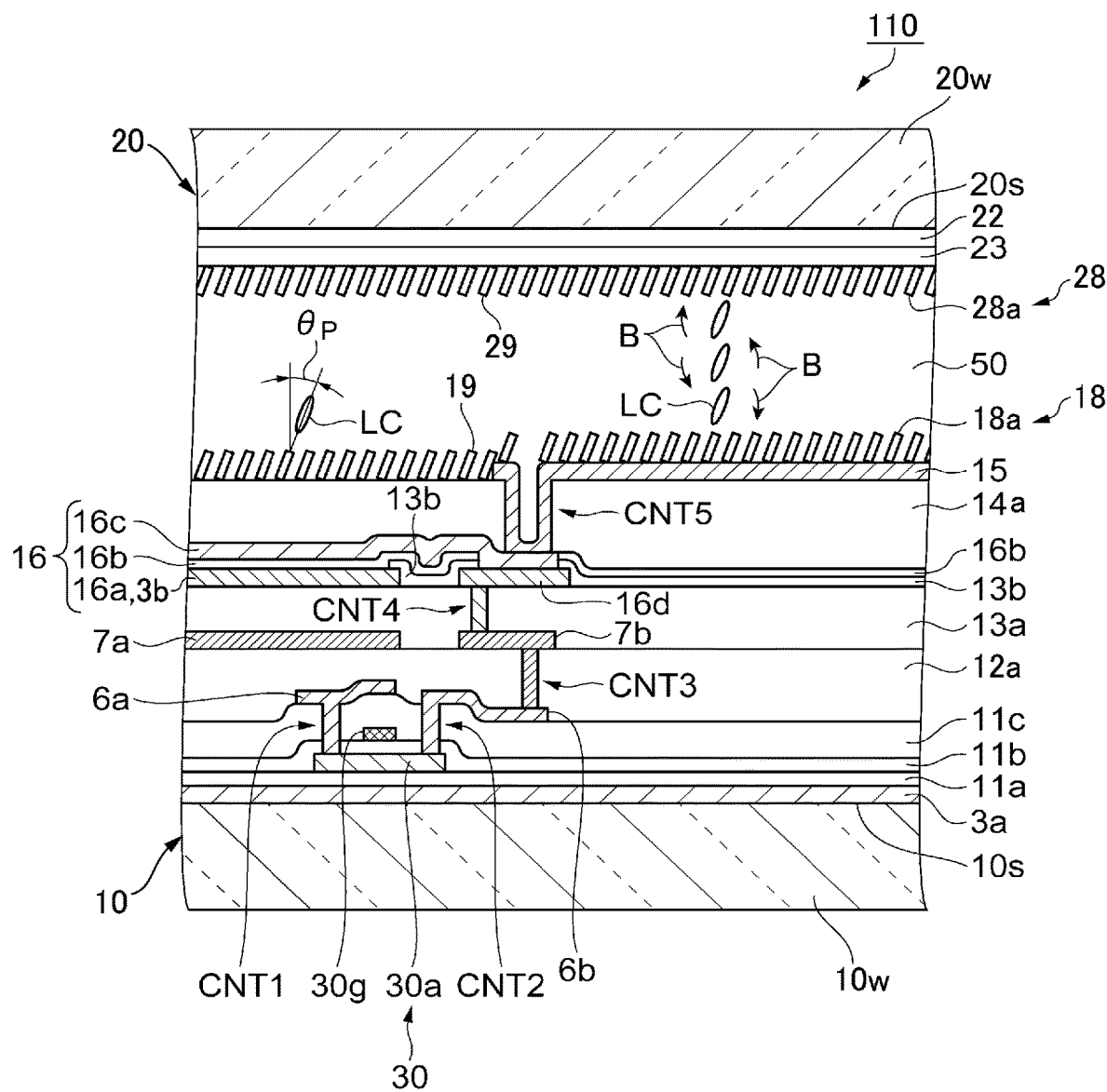
FIG. 4 is a cross-sectional view schematically illustrating structure of a pixel illustrated in FIG. 3.

FIG. 4 is a cross-sectional view schematically illustrating a structure of the pixel P illustrated in FIG. 3. As illustrated in FIG. 4, the scanning line 3a is formed at the one surface 10s of the substrate body 10w of the first substrate 10. The scanning line 3a is formed by a light shielding layer such as aluminum, titanium, chromium, tungsten, tantalum, molybdenum, or the like.

A first insulating film 11a made of silicon oxide or the like is formed at the upper layer of the scanning line 3a, and a semiconductor layer 30a is formed at an upper layer of the first insulating film 11a. The semiconductor layer 30a is formed by a polycrystalline silicon film. The semiconductor layer 30a is covered with a second insulating film 11b made of silicon oxide or the like, and a gate electrode 30g electrically coupled to the scanning line 3a is formed at an upper layer of the second insulating film 11b.

A third insulating film 11c made of silicon oxide or the like is formed at an upper layer of the gate electrode 30g. In the second insulating film 11b and the third insulating film 11c, contact holes CNT1 and CNT2 extending to a source area and a drain area of the semiconductor layer 30a are formed. The data line 6a coupled to the semiconductor layer 30a through the contact holes CNT1 and CNT2, and a first relay electrode 6b are formed at an upper layer of the third insulating film 11c. The TFT 30 is configured in this manner. In the present exemplary embodiment, the TFT 30 has a lightly doped drain (LDD) structure.

A first interlayer insulating film 12a formed of silicon oxide or the like is formed on an upper layer side of the data line 6a and the first relay electrode 6b. A surface of the first interlayer insulating film 12a is flattened by chemical mechanical polishing (CMP) processing or the like. A contact hole CNT3 extending to the first relay electrode 6b is formed in the first interlayer insulating film 12a, and a wiring line 7a and a second relay electrode 7b electrically coupled to the first relay electrode 6b through the contact hole CNT3 are formed at an upper layer of the first interlayer insulating film 12a. The wiring line 7a is formed to overlap with the semiconductor layer 30a of the TFT 30 and the data line 6a in plan view, and functions as a shield layer to which a fixed potential is applied.

A second interlayer insulating film 13a formed of silicon oxide or the like is formed on an upper layer side of the wiring line 7a and the second relay electrode 7b. A surface of the second interlayer insulating film 13a is flattened by the CMP processing or the like. A contact hole CNT4 extending to the second relay electrode 7b is formed in the second interlayer insulating film 13a.

Using a light shielding metal or the like, a first capacitor electrode 16a and a third relay electrode 16d are formed at upper layer of the second interlayer insulating film 13a. The first capacitor electrode 16a is the capacitor line 3b formed to extend across the plurality of pixels P, and a fixed potential is supplied to the first capacitor electrode 16a. An insulating film 13b is formed at an upper layer of the first capacitor electrode 16a and the third relay electrode 16d, to cover an outer edge of the first capacitor electrode 16a, an outer edge of the third relay electrode 16d, and the like. A dielectric layer 16b is formed on an upper layer side of the first capacitor electrode 16a and the insulating film 13b. The dielectric layer 16b is formed by a silicon nitride film, hafnium oxide, alumina, tantalum oxide, or the like. A second capacitor electrode 16c formed of titanium nitride or the like is formed at an upper layer of the dielectric layer 16b, and the storage capacitor 16 is configured by the first capacitor electrode 16a, the dielectric layer 16b, and the second capacitor electrode 16c. The second capacitor electrode 16c is electrically coupled to the third relay electrode 16d through a removed portion of the dielectric layer 16b and the insulating film 13b.

A fourth interlayer insulating film 14a formed of silicon oxide or the like is formed on an upper layer side of the second capacitor electrode 16c, and a surface of the fourth interlayer insulating film 14a is flattened by the CMP processing or the like. A contact hole CNT5 extending to the second capacitor electrode 16c is formed in the fourth interlayer insulating film 14a. The pixel electrodes 15 formed by a light-transmissive conductive film such as ITO are formed at upper layer of the fourth interlayer insulating film 14a, and the pixel electrodes 15 are electrically coupled to the second capacitor electrode 16c through the contact hole CNT5.

1-4. Configuration of Liquid Crystal Layer 50 and the Like

The first alignment film 18 and the second alignment film 28 are the inorganic alignment films, and are respectively formed of aggregates of columns 18a and 28a, which are each obtained by diagonally depositing and growing an inorganic material such as silicon oxide in a columnar shape. Thus, in the liquid crystal layer 50, liquid crystal molecules LC have a pre-tilt angle θp of 3° to 5° with respect to the normal direction with respect to the first substrate 10 and the second substrate 20, and are substantially aligned vertically (VA: Vertical Alignment). When a driving signal is applied between the pixel electrodes 15 and the common electrode 23, an inclination of the liquid crystal molecules LC changes in accordance with an electric field direction generated between the pixel electrodes 15 and the common electrode 23.

In FIG. 1, a diagonal deposition direction applied when forming the first alignment film 18 at the first substrate 10 is, for example, a direction indicated by an arrow C1, and is a direction that forms an angle Ga in the Y-axis direction. A diagonal deposition direction applied when forming the second alignment film 28 at the second substrate 20 is, for example, a direction indicated by an arrow C2, and is a direction that forms an angle θb in the Y-axis direction. An alignment direction of the liquid crystal molecules LC is defined by such a deposition direction. The angle θa or θb is 45 degrees, for example. The diagonal deposition direction applied when forming the first alignment film 18 at the first substrate 10 is opposite to the diagonal deposition direction applied when forming the second alignment film 28 at the second substrate 20.

1-5. Description of Pixel Area E and the Like

Figure 5:
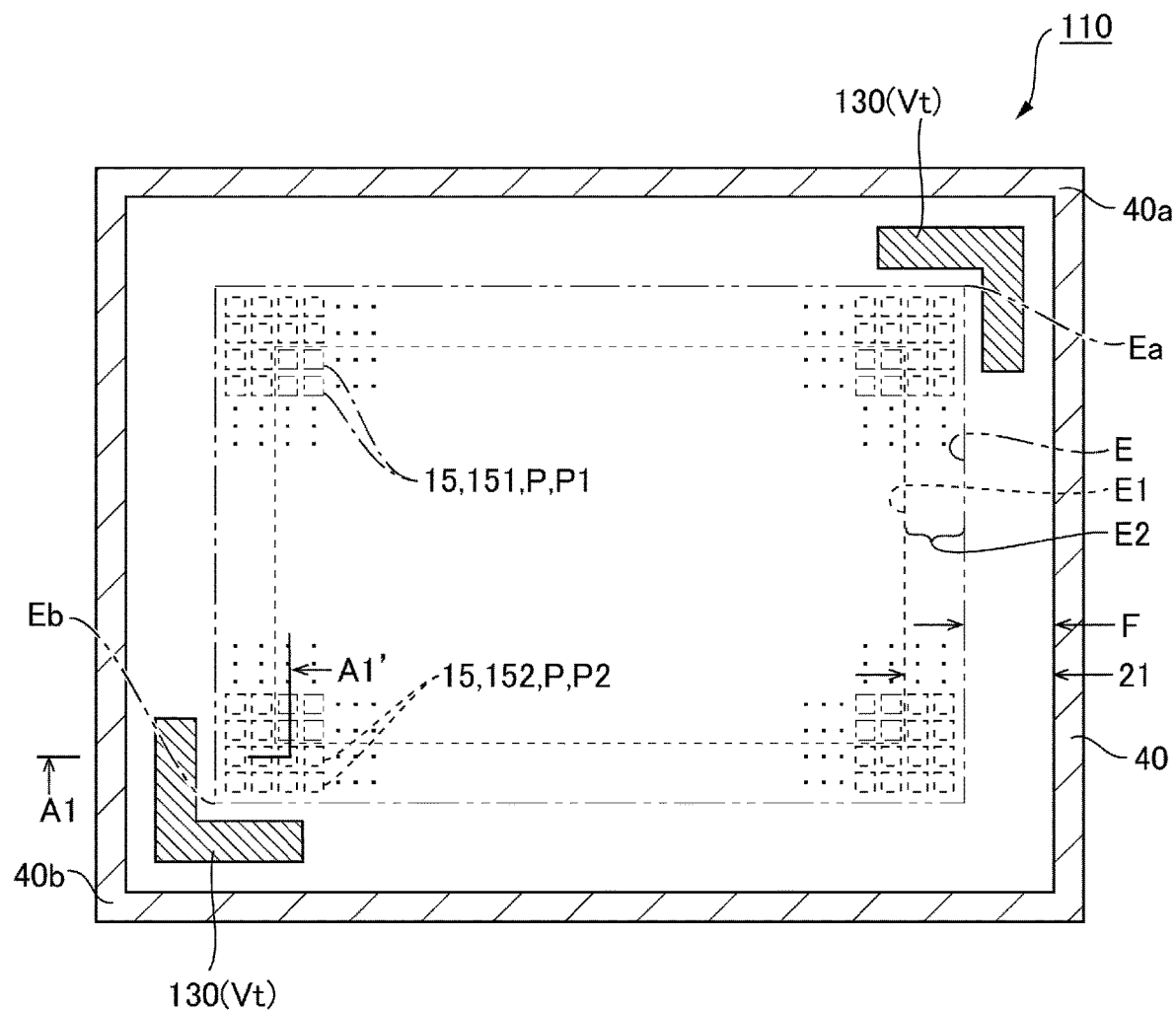
FIG. 5 is an explanatory diagram illustrating each area of the liquid crystal device illustrated in FIG. 1.
Figure 6:
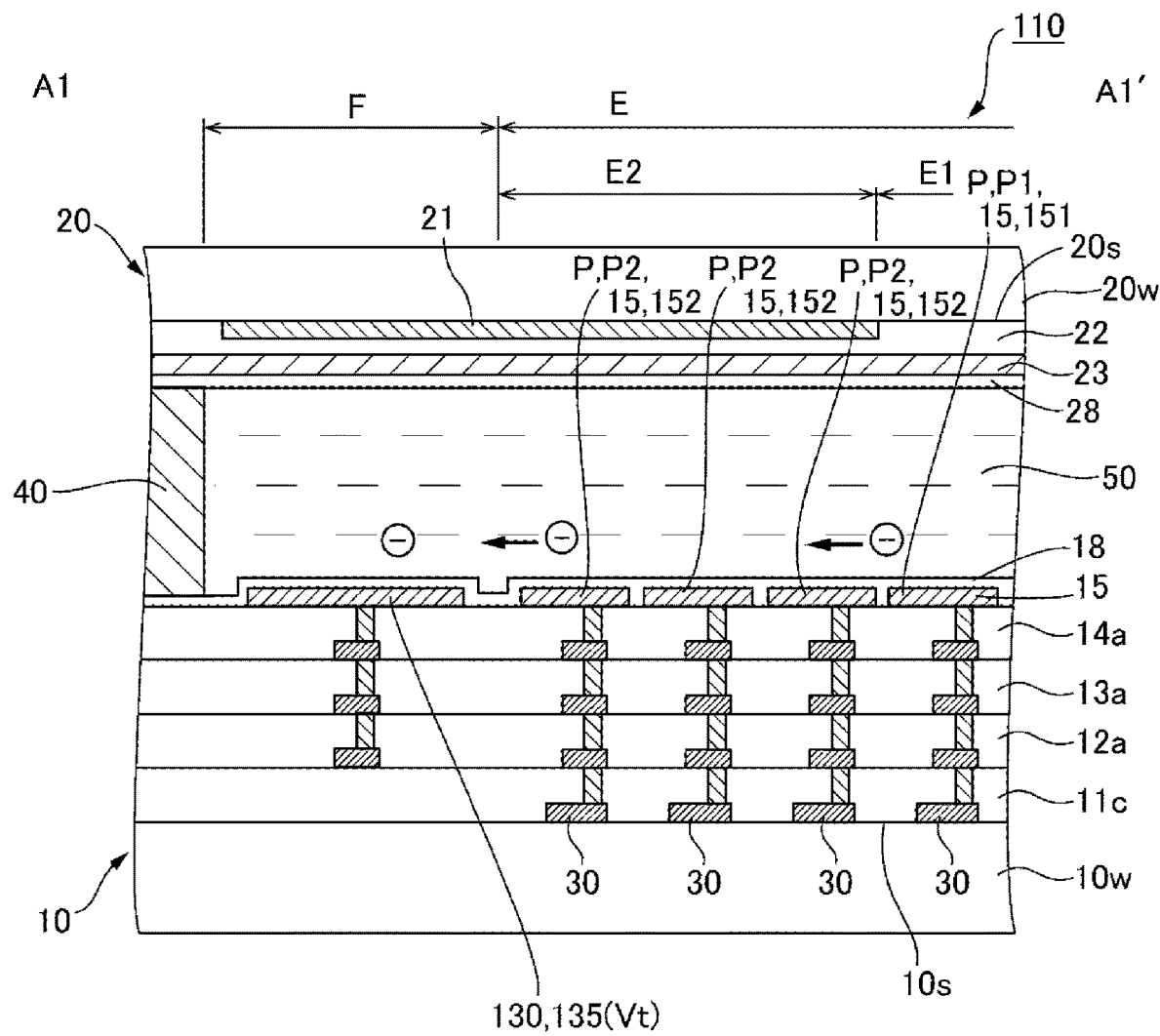
FIG. 6 is an explanatory diagram schematically illustrating an A1-A1' cross section of the liquid crystal device illustrated in FIG. 5.

FIG. 5 is an explanatory diagram illustrating each area of the liquid crystal device 110 illustrated in FIG. 1, and is an explanatory diagram of an area where the first substrate 10 and the second substrate 20 overlap. FIG. 6 is an explanatory diagram schematically illustrating the A1-A1' cross section of the liquid crystal device 110 illustrated in FIG. 5. As illustrated in FIG. 5 and FIG. 6, the plurality of pixels P are disposed in the X-axis direction and the Y-axis direction in the pixel area E of the liquid crystal device 110, and each of the plurality of pixels P includes the pixel electrode 15 electrically coupled to the TFT 30. The pixel P and the pixel electrode 15 have the same planar shape, size, arrangement pitch, and the like.

The pixel area E includes a first pixel area E1 as a display area that directly contributes to display of an image, and a second pixel area E2 that surrounds a periphery of the first pixel area E1 between the first pixel area E1 and the seal material 40, and the second pixel area E2 is a dummy pixel area that does not directly contribute to display of an image. Therefore, the plurality of pixels P include a plurality of first pixels P1 disposed in the first pixel area E1, and a plurality of second pixels P2 disposed in the second pixel area E2. Further, the plurality of pixel electrodes 15 include a plurality of first pixel electrodes 151 constituting the first pixel P1 in the first pixel area E1, and a plurality of second pixel electrodes 152 constituting the second pixel P2 in the second pixel area E2. The first pixel electrode 151 may be referred to as an effective pixel electrode or the like, and the second pixel electrode 152 may be referred to as a dummy pixel electrode or the like. However, although the first pixel P1 and the second pixel P2 are supplied with different signals, respectively, but have the same structure.

In an aspect illustrated in FIG. 5, pairs of two second pixels P2 are disposed in the second pixel area E2, respectively, with the first pixel area E1 interposed therebetween in the X-axis direction, and pairs of two second pixels P2 are disposed, respectively, with the first pixel area E1 interposed therebetween in the Y-axis direction. However, the number of second pixels P2 disposed in the second pixel area E2 is not limited to this example, and an aspect may be adopted in which at least one pair of the second pixels P2, or one pair of the three or more second pixels P2 are disposed, respectively, in each of the X-axis direction and the Y-axis direction with the first pixel area E1 interposed therebetween.

In the present exemplary embodiment, regardless of a display state in the first pixel P1, the first driving potential described later is applied to the second pixel electrode 152. Accordingly, the partition portion 21 is formed in an area that overlaps with the peripheral area F and the second pixel area E2 in plan view so that the second pixel P2 is not visible.

1-6. Polarity Inversion Drive in First Pixel Electrode 151

Figure 7:
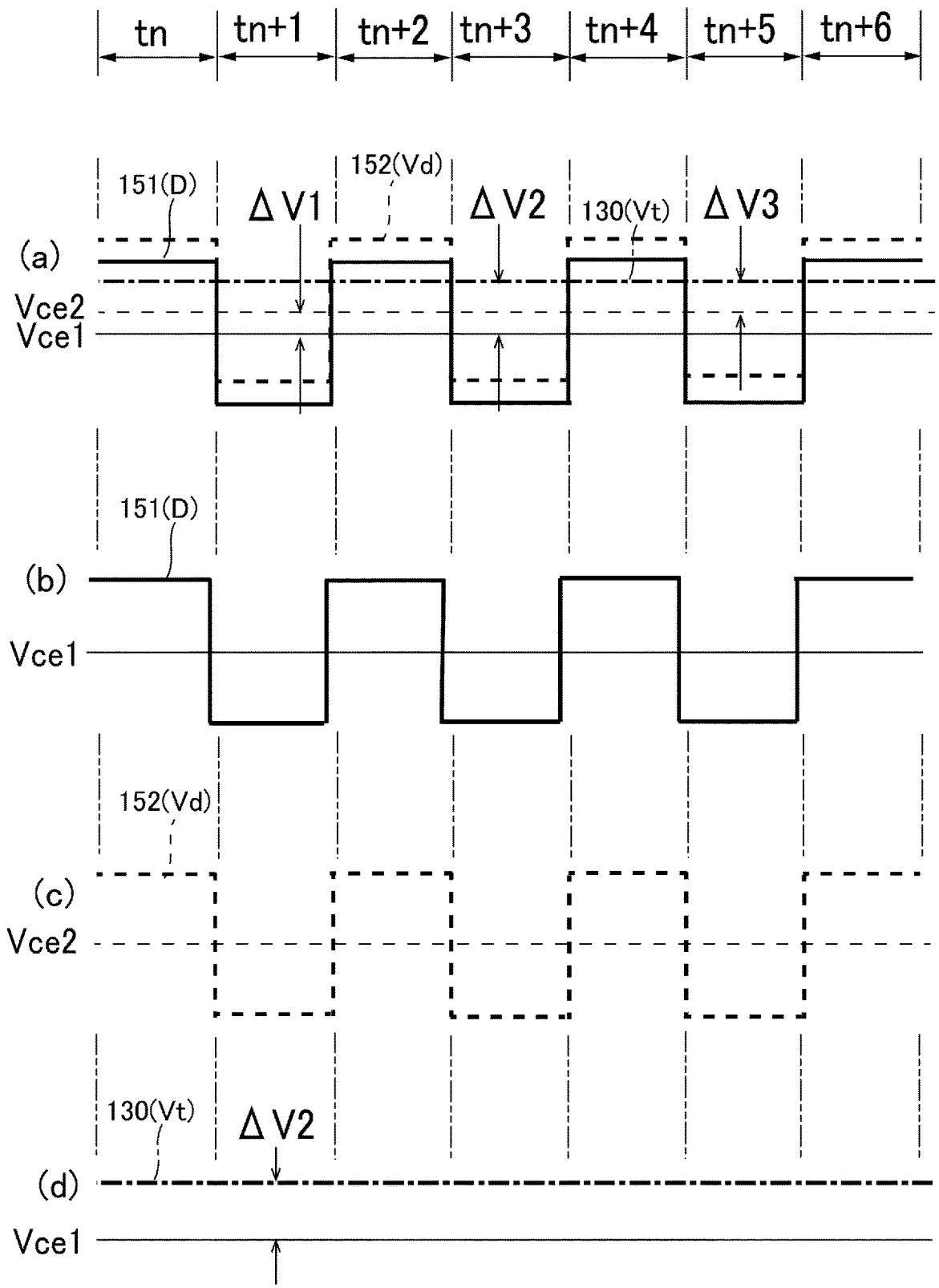

FIG. 7 is an explanatory diagram of an image signal D applied to the first pixel electrode 151 illustrated in FIG. 1 and the like. In each of sections (b), (c), and (d) in FIG. 7, the image signal D, a first driving potential Vd, and a second driving potential Vt are illustrated, and potential differences are illustrated in an uppermost section (a). Note that, in the following description, each of the image signals D1 to Dn is simply described as the image signal D. Additionally, in the image signal D, a potential varies with time in accordance with gradation in the first pixel P1, but in FIG. 7, for convenience, a case is illustrated in which, in each of frame periods tn, tn+1, . . . , the image signal D is fixed to a potential for performing white display.

When a DC potential is applied to the liquid crystal layer 50 described with reference to FIG. 4 and the like, the liquid crystal layer 50 deteriorates, and a defect such as ghosting may occur in a display image in some cases. In order to prevent occurrence of such a defect, as illustrated in FIG. 7, in the present exemplary embodiment, in the image signal D applied to the first pixel electrode 151, a potential alternately switches between a positive polarity and a negative polarity with reference to the first central potential Vce1 with the first central potential Vce1 as a center. The first central potential Vce1 corresponds to an average value of potentials when the image signal D sets the first pixel P1 to the same gradation in a period of the positive polarity and in a period of the negative polarity.

Here, the first central potential Vce1 is the common potential Vcom applied to the common electrode 23, or a potential near the common potential Vcom. For example, when image quality deteriorates when polarities of the respective image signals D1 to Dn are inverted due to a voltage drop or the like by the TFT 30, which is the switching element, and in order to prevent the deterioration, the first central potential Vce1 may be set to a potential displaced from the common potential Vcom. However, in the present exemplary embodiment, a case where the first central potential Vce1 is set to the common potential Vcom is illustrated.

1-7. Countermeasures Against Ionic Impurities

As described with reference to FIG. 4, when the liquid crystal layer 50 is driven by supplying an image signal to the pixel electrode 15, the liquid crystal molecules LC vibrate, as indicated by arrows B, and a flow of the liquid crystal molecules LC occurs in the diagonal deposition directions indicated by the arrows C1 and C2 illustrated in FIG. 1. Therefore, when ionic impurities are included in the liquid crystal layer 50 due to contamination during liquid crystal injection, elution from the seal material 40, or the like, the ionic impurities move toward corners Ea and Eb of the pixel area E along the flow of the liquid crystal molecules LC, and are to be unevenly distributed.

Thus, the second pixel electrode 152 is applied with the first driving potential Vd, the first driving potential Vd having a potential alternately switching between the positive polarity and the negative polarity with reference to the second central potential Vce2 with the second central potential Vce2 as a center, the first central potential Vce1 and the second central potential Vce2 having a first potential difference $\Delta V1$ set therebetween. Here, the image signal D and the first driving potential Vd have the same maximum amplitude, cycle, and polarity. For example, the image signal D and the first driving potential Vd have the maximum amplitude of 10 V, and the cycle is 16.7 msec.

According to such a configuration, when the liquid crystal device 110 is driven, the ionic impurities entering the liquid crystal layer 50 in the first pixel area E1 of the pixel area E are swept to the second pixel area E2 by a lateral electric field between the first pixel electrode 151 and the second pixel electrode 152, and a vertical electric field between the second pixel electrode 152 and the common electrode 23. In the present exemplary embodiment, for example, when focusing on the entrance of the ionic impurities from the seal material 40 or the like to the liquid crystal layer 50, since there are more anionic impurities than cationic impurities in general, countermeasures against anions having a negative polarity are focused. Thus, the second central potential Vce2 is set to a potential higher than the first central potential Vce1. Accordingly, the anionic impurities entering the liquid crystal layer 50 in the first pixel area E1 can be swept to the second pixel area E2.

Furthermore, since the first pixel electrode 151 and the second pixel electrode 152 are in proximity, the anionic impurities entering the liquid crystal layer 50 in the first pixel area E1 can be efficiently swept in a short time to the second pixel area E2. Accordingly, it is possible to reduce the anionic impurities entering the liquid crystal layer 50 in the first pixel area E1, and thus uneven distribution of the anionic impurities in the first pixel area E1 can be suppressed. Therefore, it is possible to suppress the deterioration of image quality due to the uneven distribution of the anionic impurities.

Here, the first potential difference $\Delta V1$ may be equal to or greater than 0.2 V, and less than 3 V. When the first potential difference $\Delta V1$ is less than 0.2 V, force at which the second pixel electrode 152 draws the ionic impurities tends to decrease. In contrast, when the first potential difference $\Delta V1$ exceeds 3 V, generation of bubbles or the like may occur in the liquid crystal layer 50.

Furthermore, in the present exemplary embodiment, as illustrated in FIGS. 5 and 6, the electrode 130 is provided in the peripheral area F between the seal material 40 and the pixel area E in the first substrate 10, and the electrode 130 faces the common electrode 23 via the liquid crystal layer 50. The electrode 130 is provided at least between the corner of the pixel area E where the ionic impurities are to be unevenly distributed, and corners of the seal material 40. In the present exemplary embodiment, corresponding to the diagonal deposition direction indicated by the arrows C1 and C2 illustrated in FIG. 1, the electrode 130 is provided at least between the two corners Ea and Eb in the diagonal direction of the pixel area E, and the two corners 40a and 40b in the diagonal direction of the seal material 40, respectively.

The DC second driving potential Vt illustrated in FIG. 7 is applied to the electrode 130. In the present exemplary embodiment, for the second driving potential Vt, a polarity with reference to the first central potential Vce1 is equal to a polarity of the second central potential Vce2 with reference to the first central potential Vce1. Also, a second potential difference ΔV2, which is a potential difference between the first central potential Vce1 and the second driving potential Vt, is greater than the first potential difference ΔV1, which is the potential difference between the first central potential Vce1 and the second central potential Vce2. In the present exemplary embodiment, a third potential difference ΔV3, which is a potential difference between the second driving potential Vt and the second central potential Vce2, is greater than the first potential difference ΔV1.

Accordingly, when the liquid crystal device 110 is driven, the ionic impurities entering the liquid crystal layer 50 in the first pixel area E1 are swept from the first pixel area E1 to the second pixel area E2 by the second pixel electrode 152, and then swept to the peripheral area F by a lateral electric field between the second pixel electrode 152 and the electrode 130, and a vertical electric field between the electrode 130 and the common electrode 23. Accordingly, it is possible to reduce the anionic impurities entering the liquid crystal layer 50 in the first pixel area E1, and thus uneven distribution of the anionic impurities in the first pixel area E1 can be suppressed. Therefore, it is possible to suppress the deterioration of image quality due to the uneven distribution of the anionic impurities.

Here, the third potential difference ΔV3 between the second driving potential Vt and the second central potential Vce2 may be equal to or greater than 1 V and less than 3 V. When the third potential difference ΔV3 is less than 1 V, force at which the electrode 130 draws the ionic impurities tends to decrease. In contrast, when the third potential difference ΔV3 exceeds 3 V, generation of bubbles or the like may occur in the liquid crystal layer 50.

1-8. Another Aspect of Electrode 130

Figure 8:
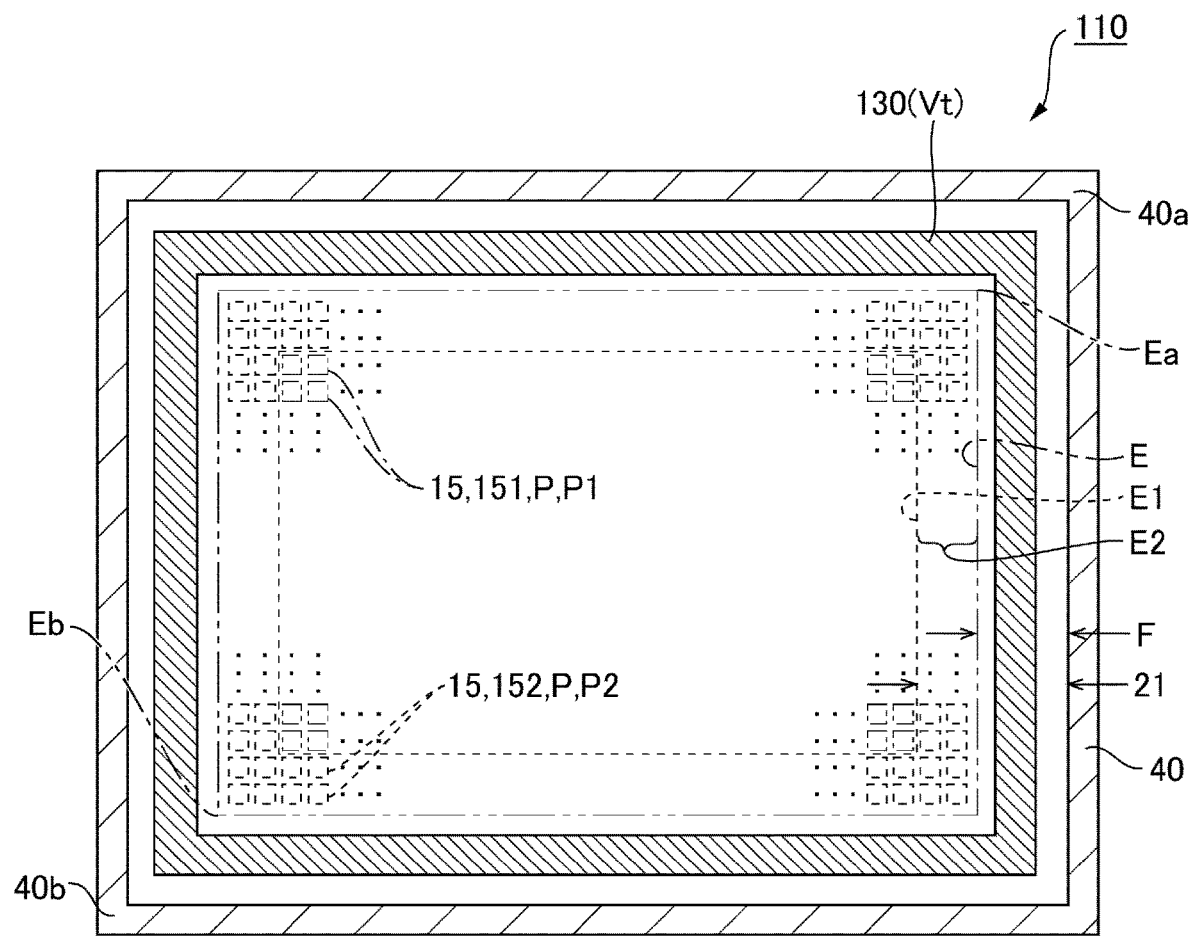
FIG. 8 is an explanatory diagram of another aspect of an electrode illustrated in FIG. 5.

FIG. 8 is an explanatory diagram of another aspect of the electrode 130 illustrated in FIG. 5. In the aspect illustrated in FIG. 5, the electrodes 130 are provided between the two corners Ea and Eb in the diagonal direction of the pixel area E, and the two corners 40a and 40b in the diagonal direction of the seal material 40, respectively, but an aspect may be adopted in which the electrodes 130 extend along the pixel area E from the two corners Ea and Eb, respectively. For example, as illustrated in FIG. 8, an aspect may be adopted in which the electrode 130 extends in a frame shape so as to surround an entire circumference of the pixel area E.

2. Second Exemplary Embodiment

Figure 9:
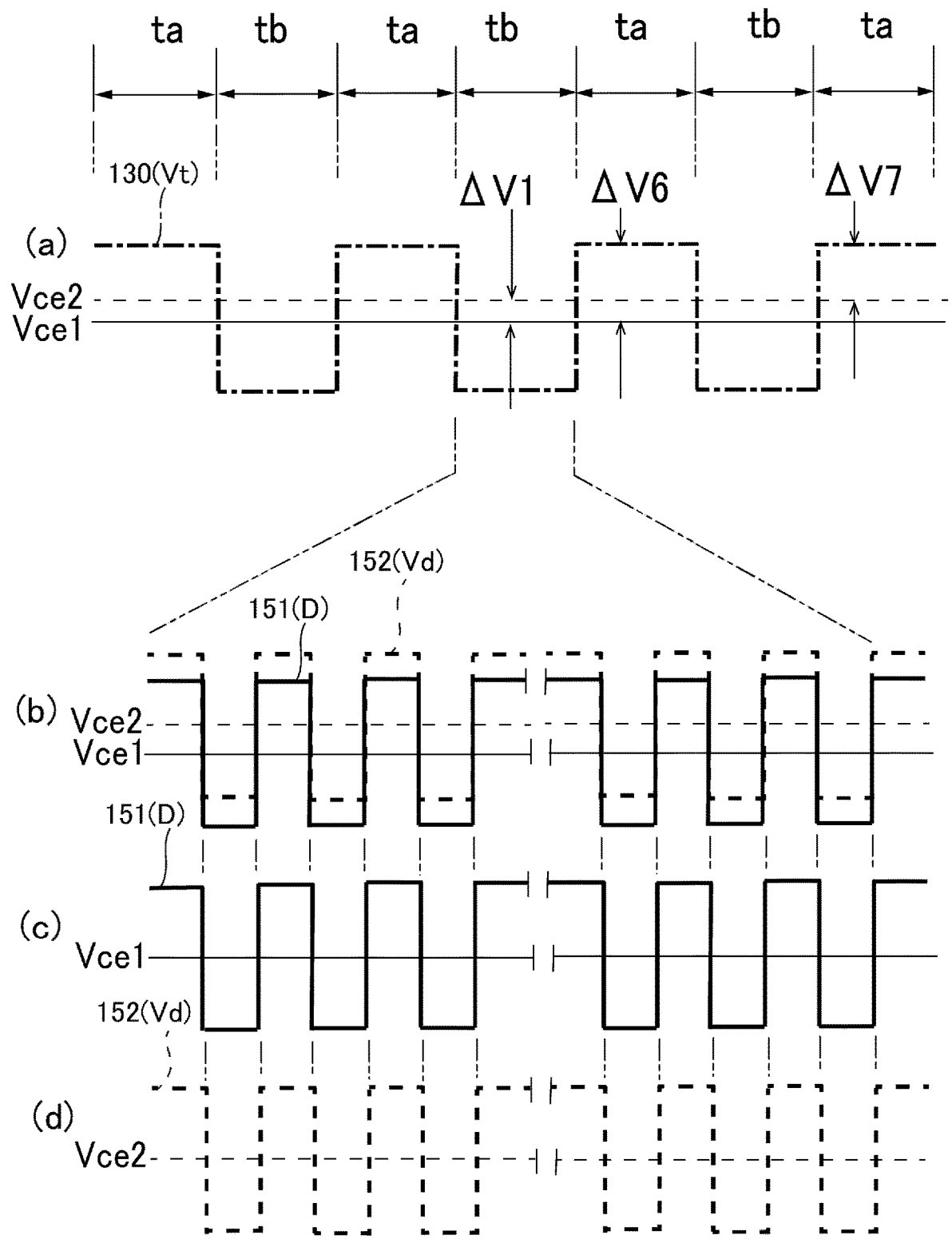
FIG. 9 is an explanatory diagram of a liquid crystal device according to a second exemplary embodiment of the present disclosure.

FIG. 9 is an explanatory diagram of the liquid crystal device 110 according to a second exemplary embodiment of the present disclosure, and the image signal D applied to the first pixel electrode 151 and the like are illustrated in FIG. 9. In each of sections (a), (b), (c), and (d) in FIG. 9, a comparison of the second driving potential Vt, the image signal D, and the first driving potential Vd, the image signal D, and the first driving potential Vd are illustrated. Note that, a basic configuration of the present exemplary embodiment is similar to that of the first exemplary embodiment, and only the second driving potential Vt is different. Accordingly, common parts are denoted by the same reference numerals, and descriptions thereof are omitted. Additionally, in the image signal D, the potential varies with time in accordance with gradation in the plurality of first pixels P1, but in FIG. 9, as in the case of FIG. 7, for convenience, a case is illustrated in which, in each of frame periods, the image signal D is fixed to a potential for performing white display.

As illustrated in FIG. 9, even in the present exemplary embodiment, in the image signal D applied to the first pixel electrode 151, a potential alternately switches between a positive polarity and a negative polarity with reference to the first central potential Vce1 with the first central potential Vce1 as a center. The first central potential Vce1 corresponds to an average value of potentials when the image signal D sets the first pixel P1 to the same gradation in a period of the positive polarity and in a period of the negative polarity. The first central potential Vce1 is the common potential Vcom applied to the common electrode 23, or a potential near the common potential Vcom, and in the present exemplary embodiment, the first central potential Vce1 is the same potential as the common potential Vcom.

Further, even in the present exemplary embodiment, similarly to the first exemplary embodiment, the second pixel electrode 152 is applied with the first driving potential Vd, the first driving potential Vd having a potential alternately switching between the positive polarity and the negative polarity with reference to the second central potential Vce2 with the second central potential Vce2 as a center, the first central potential Vce1 and the second central potential Vce2 having the first potential difference ΔV1 set therebetween. Here, the image signal D and the first driving potential Vd have the same maximum amplitude, cycle, and polarity. For example, the image signal D and the first driving potential Vd have the maximum amplitude of 10 V, and the cycle is 16.7 msec. Thus, when the liquid crystal device 110 is driven, the ionic impurities entering the liquid crystal layer 50 in the first pixel area E1 of the pixel area E are swept to the second pixel area E2 by a lateral electric field between the first pixel electrode 151 and the second pixel electrode 152, and a vertical electric field between the second pixel electrode 152 and the common electrode 23.

Even in the present exemplary embodiment, similar to the first exemplary embodiment, the second central potential Vce2 is set to be higher than the second central potential Vce2, from the perspective of placing the emphasis on countermeasures against anions having a negative polarity among the ionic impurities. Accordingly, the anionic impurities entering the liquid crystal layer 50 in the first pixel area E1 can be swept to the second pixel area E2.

Furthermore, since the first pixel electrode 151 and the second pixel electrode 152 are in proximity, the anionic impurities entering the liquid crystal layer 50 in the first pixel area E1 can be efficiently swept in a short time to the second pixel area E2. Even in the present exemplary embodiment, similar to the first exemplary embodiment, the first potential difference ΔV1 may be equal to or greater than 0.2 V, and less than 3 V.

Further, even in the present exemplary embodiment, similar to the first exemplary embodiment, as illustrated in FIGS. 5 and 6, the electrode 130 is provided in the peripheral area F between the seal material 40 and the pixel area E in the first substrate 10, and the electrode 130 faces the common electrode 23 via the liquid crystal layer 50. In the first exemplary embodiment, the AC potential is applied to the electrode 130, but in the present exemplary embodiment, the AC second driving potential Vt illustrated in FIG. 9 is applied to the electrode 130. A potential of the second driving potential Vt with reference to the first central potential Vce1 alternately switches between a positive polarity and a negative polarity. Further, a polarity inversion cycle of the second driving potential Vt is, for example, 120 sec., and is longer than a polarity inversion cycle of the image signal D.

In a period in which a polarity with reference to the first central potential Vce1 is equal to a polarity of the second central potential Vce2 with reference to the first central potential Vce1, a maximum potential difference ΔV6 between the second driving potential Vt and the first central potential Vce1 is greater than the first potential difference ΔV1 between the first central potential Vce1 and the second central potential Vce2. Further, in a period in which a polarity with reference to the first central potential Vce1 is equal to a polarity of the second central potential Vce2 with reference to the first central potential Vce1, a maximum potential difference ΔV7 between the second driving potential Vt and the second central potential Vce2 is greater than the first potential difference ΔV1 between the first central potential Vce1 and the second central potential Vce2.

In the liquid crystal device 110 configured in this manner, as illustrated in FIG. 6, in a positive polarity period ta in which a potential of the electrode 130 becomes higher than the first central potential Vce1 and the second central potential Vce2 during display driving of the liquid crystal device 110, the anionic impurities swept to the second pixel area E2 by the second pixel electrode 152 are suctioned by the electrode 130.

Next, during a negative polarity period tb in which the potential of the electrode 130 becomes lower than the first central potential Vce1 and the second central potential Vce2, the anionic impurities suctioned by the electrode 130 are released from the electrode 130. At this time, the cationic impurities entering the liquid crystal layer 50 of the pixel area E are swept from the pixel area E to the peripheral area F as a result of being suctioned by the electrode 130.

Next, in the positive polarity period ta in which the potential of the electrode 130 becomes higher than the first central potential Vce1 and the second central potential Vce2, the anionic impurities are suctioned by the electrode 130. During that time, the cationic impurities suctioned by the electrodes 130 are released from the electrodes 130.

After that, the negative polarity period tb and the positive polarity period ta are alternately repeated. Therefore, in the positive polarity period ta, the anionic impurities are suctioned by the electrode 130, and thus the anionic impurities are swept from the pixel area E to the peripheral area F. Also, in the negative polarity period tb, the cationic impurities are suctioned by the electrode 130, and thus the cationic impurities are swept from the pixel area E to the peripheral area F. Accordingly, the anionic impurities can be efficiently drawn from the pixel area E into the peripheral area F.

Further, the second driving potential Vt is applied to the electrode 130. Therefore, since the potential of the electrode 130 is not fixed to the positive polarity, the anionic impurities do not continue to adsorb to the electrode 130. Furthermore, since the potential of the electrode 130 is not fixed to the negative polarity, the cationic impurities do not continue to adsorb to the electrode 130. Therefore, at a surface of the electrode 130, an ionic layer due to adsorption of the anionic impurities, or an ionic layer due to adsorption of the cationic impurities is unlikely to be formed, and thus a situation is unlikely to occur in which the potential applied to the electrode 130 is shielded by an ionic layer. Therefore, a sufficient number of ionic impurities can be retained near the electrode 130. Thus, a situation is unlikely to occur in which anionic impurities and the like are unevenly distributed at the corners Ea and Eb of the pixel area E, and thus defects such as display irregularity, and a ghosting phenomenon due to energization are unlikely to occur.

Here, the maximum potential difference between the second driving potential Vt and the second central potential Vce2 may be equal to or greater than 1 V and less than 3 V. When such a maximum potential difference is less than 1 V, force at which the electrode 130 draws the ionic impurities tends to decrease. In contrast, when the maximum potential difference exceeds 3 V, generation of bubbles or the like may occur in the liquid crystal layer 50.

Note that, in the present exemplary embodiment, a length of the positive polarity period ta in which the second driving potential Vt has the positive polarity and a length of the negative polarity period tb in which the second driving potential Vt has the negative polarity are equal, but corresponding to the polarity of the ionic impurities, the length of the positive polarity period ta and the length of the negative polarity period tb may be different. For example, when the ionic impurities focused in view of countermeasures are anions having a negative polarity, the length of the positive polarity period ta is set to be longer than the length of the negative polarity period tb.

3. Third Exemplary Embodiment

In the first exemplary embodiment and the second exemplary embodiment, the countermeasures against the anionic impurities are focused, but when focusing on countermeasures against cationic impurities, the second central potential Vce2 is set to be lower than the first central potential Vce1, or the like, such that respective polarities of the second central potential Vce2 and the second driving potential Vt are inverted. Additionally, in the second exemplary embodiment, the length of the negative polarity period tb may be longer than the length of the positive polarity period ta.

4. Fourth Exemplary Embodiment 4-1. Configuration of Organic Silane Compound Layers 19 and 29

Figure 10:
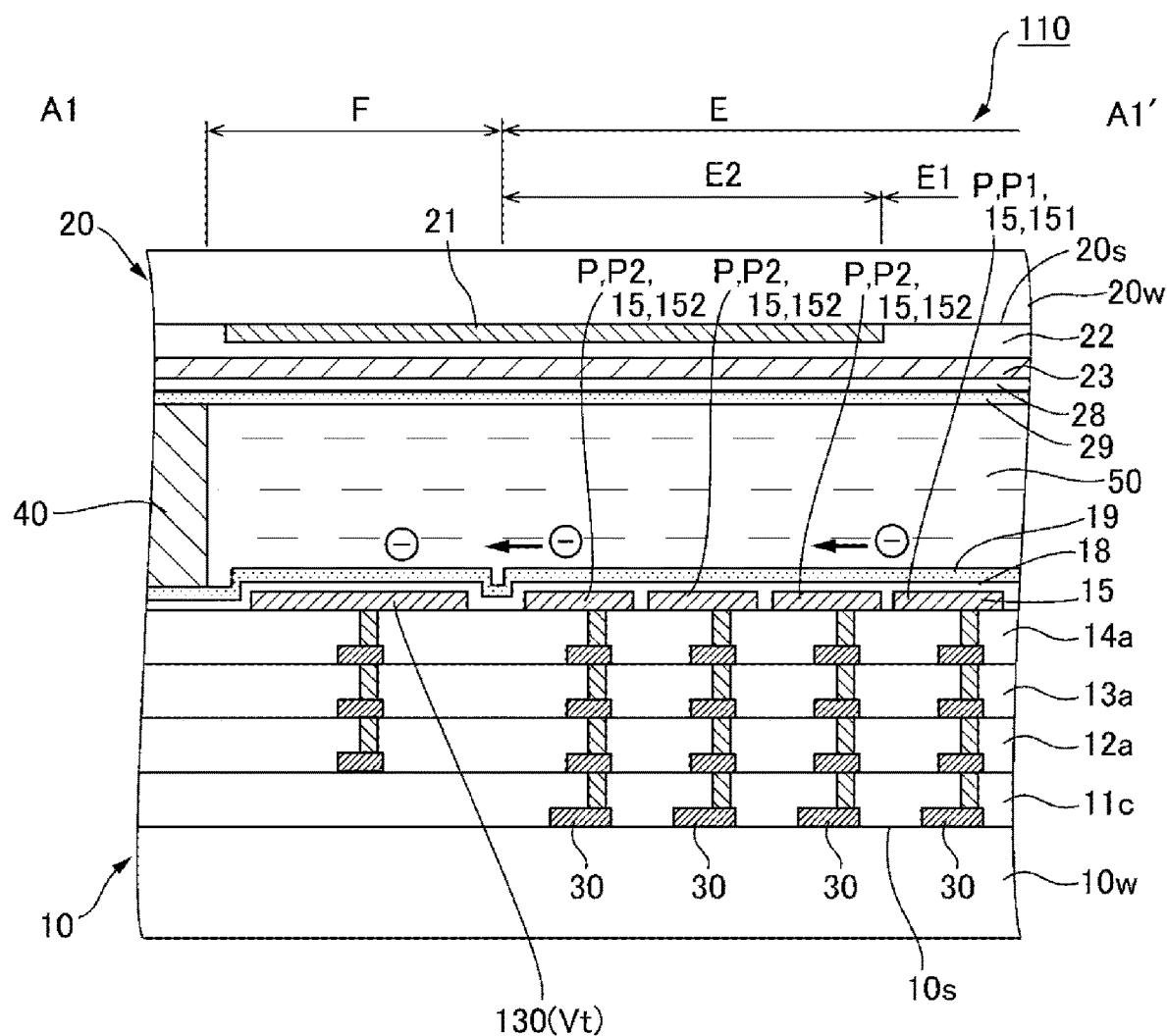
FIG. 10 is an explanatory diagram of a liquid crystal device according to a fourth exemplary embodiment of the present disclosure.
Figure 11:
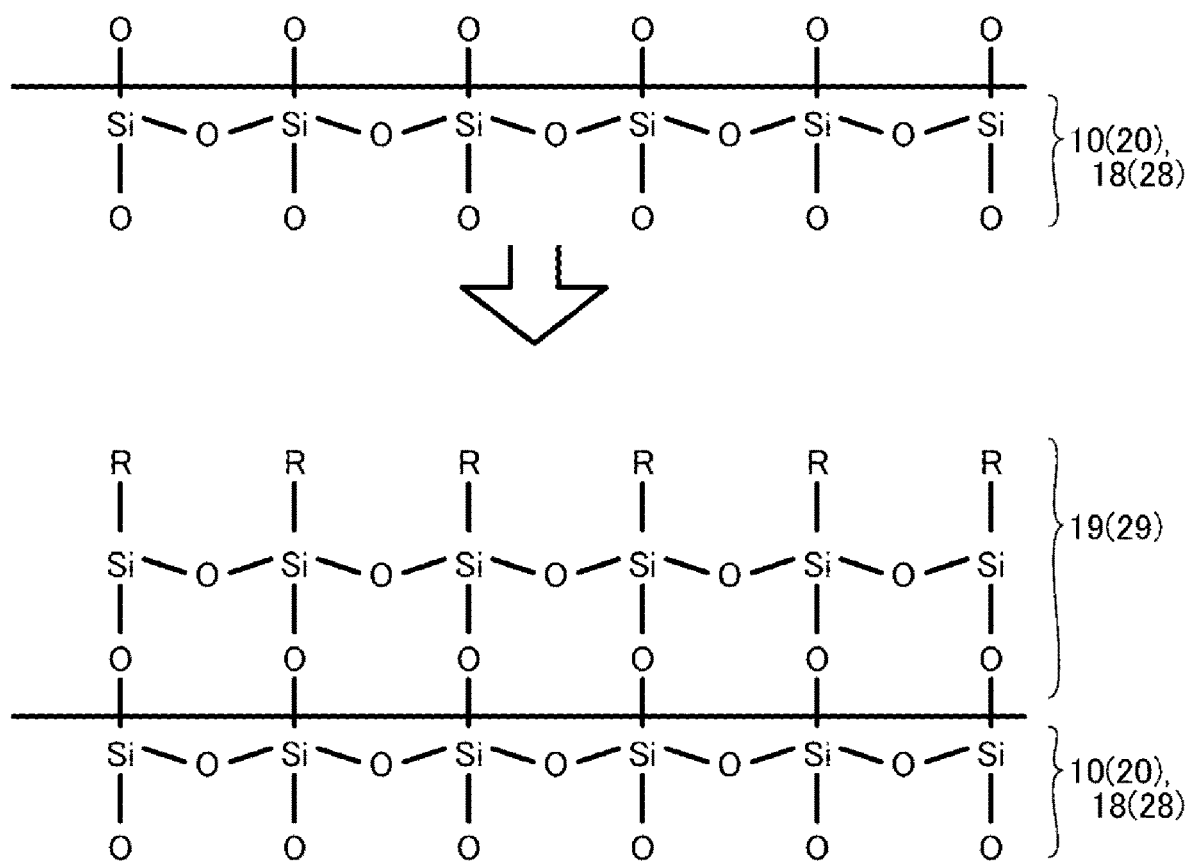
FIG. 11 is an explanatory diagram of an organic silane compound layer illustrated in FIG. 10.

FIG. 10 is an explanatory diagram of the liquid crystal device 110 according to a fourth exemplary embodiment of the present disclosure. FIG. 11 is an explanatory diagram of the organic silane compound layers 19 and 29 illustrated in FIG. 10.

As illustrated in FIG. 10 and FIG. 11, in the liquid crystal device 110 of the present exemplary embodiment, there is an unbonded hand (dangling bond) of an Si atom, or dimer structure (Si—Si bond) in which Si atoms are bonded together, in SiOx forming the first alignment film 18 and the second alignment film 28, and the unbonded hand of such an Si atom is likely to be terminated by a silanol group (—Si—OH) by a reaction with moisture in an atmosphere or moisture in the liquid crystal layer 50. Here, the silanol group is highly reactive. In particular, a projection-type display device 100 described below, is irradiated with strong light source light, and thus a photochemical reaction is likely to occur between the silanol groups of the first alignment film 18 and the second alignment film 28, and a liquid crystal material. Therefore, in the present exemplary embodiment, the organic silane compound layers 19 and 29 made of organopolysiloxane or the like are bonded to hydroxyl group (—OH) portions by a silane coupling agent such as an organic siloxane, at surfaces of the first alignment film 18 and the second alignment film 28, respectively.

More specifically, after producing silanol (Si—OH) by hydrolysis, the silane coupling agent produces siloxane bonds (Si—O—Si) by gradually condensing silanol, to form the organic silane compound layers 19 and 29. Further, the silane coupling agent also reacts with an inorganic oxide surface by a similar mechanism to produce strong covalent bonding with the inorganic oxide surface. Therefore, contact between the silanol groups of the first alignment film 18 and the second oriented film 28, and liquid crystal material of the liquid crystal layer 50 is suppressed. Therefore, a photochemical reaction is unlikely to occur between the silanol groups of the first alignment film 18 and the second alignment film 28, and the liquid crystal material. Here, respective thicknesses of the organic silane compound layers 19 and 29 are extremely thin, with respect to respective heights of the columns 18*a* and 28*a* that form the first alignment film 18 and the second oriented film 28, respectively. For example, the respective heights of the columns 18*a* and 28*a* that form the first alignment film 18 and the second alignment film 28, respectively, are usually tens of nanometers, whereas the respective thicknesses of the organic silane compound layers 19 and 29 are usually several nm. Thus, the organic silane compound layers 19 and 29 are less likely to affect alignment regulating force of the first alignment film 18 and the second alignment film 28, respectively.

Examples of the silane coupling agent include n-hexyltrimethoxysilane, n-hexyl triethoxysilane, cyclohexylmethyl dimethoxysilane, n-octyltriethoxysilane, n-decyltrimethoxysilane, and the like. In the present exemplary embodiment, n-decyltrimethoxysilane is used as the silane coupling agent, and n-decyltrimethoxysilane has an n-decyl group as a hydrophobic functional group. Also, the silane coupling agent may have fluorine atoms.

Of these silane coupling agents, for example, when a trimethoxysilane-based silane compound is used, the trimethoxysilane-based silane compound is individually bonded to each of 30% or more of the silanol groups present per unit area of a surface without bonding to each other. Here, a molecular size of the trimethoxysilane-based silane compound bonded to the silanol group is larger than an interval between the silanol groups present on the respective surfaces of the first alignment film 18 and the second alignment film 28. Therefore, even without bonding the silane compounds to substantially all of the silanol groups present at the respective surface of the first alignment film 18 and the second oriented film 28, a terminal group of the silane compound bonded to the silanol group causes a steric hindrance to occur in a silanol group to which a silane compound is not bonded, and between liquid crystal molecules. In this case, a terminal group R mainly contributes to the occurrence of steric hindrance, and the silane compound bonded to the silanol group can suppress bonding of the silanol group to which the silane compound is not bonded and liquid crystal molecules by a photochemical reaction when the liquid crystal device 110 is operating, and light resistance can be enhanced.

Furthermore, since the organic silane compound layers 19 and 29 are hydrophobic, a contact angle with water is large. Therefore, the organic silane compound layers 19 and 29 have low ion adsorption properties. Thus, the organic silane compound layers 19 and 29 can suppress adsorption of ionic impurities in the first alignment film 18 and the second alignment film 28, respectively. Therefore, ionic impurities included in the liquid crystal layer 50 in the pixel area E are easily drawn by the electrodes 130. In addition, in the first alignment film 18 covering the electrode 130, ion adsorption properties are reduced by the organic silane compound layer 19, thus a situation is unlikely to occur in which ionic impurities drawn by the electrode 130 adsorb to the first alignment film 18 to form an ionic layer. Accordingly, a situation is unlikely to occur in which a potential applied to the electrode 130 is shielded by an ionic layer, and thus the electrode 130 is likely to draw ionic impurities included in the liquid crystal layer 50 of the pixel area E.

4-2. Another Aspect of Organic Silane Compound Layer 29

Figure 12:
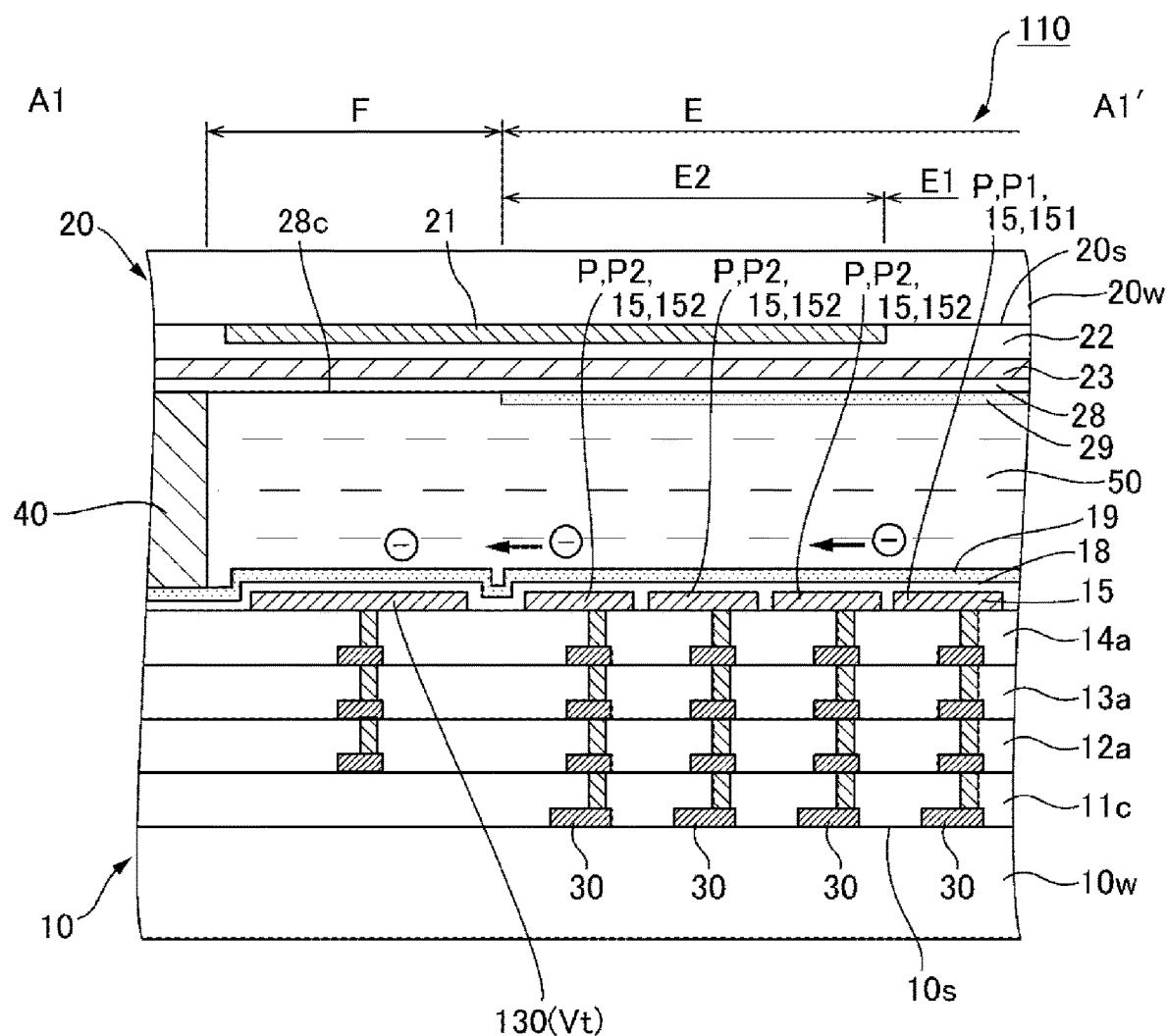
FIG. 12 is an explanatory diagram of another aspect of the organic silane compound layer illustrated in FIG. 10.

FIG. 12 is an explanatory diagram of another aspect of the organic silane compound layer 29 illustrated in FIG. 9. In the exemplary embodiment illustrated in FIG. 10, the area facing the electrode 130 in the second alignment film 28 is covered with the organic silane compound layer 29, but in the present exemplary embodiment, the organic silane compound layer 29 is not formed in an area facing the electrode 130 in the second alignment film 28, as illustrated in FIG. 12. Thus, the area facing the electrode 130 in the second alignment film 28 is an exposed portion 28*c* from the organic silane compound layer 29, and the exposed portion 28*c* is highly hydrophilic, and ionic impurities are easily adsorbed.

Therefore, even when anionic impurities are released from the electrode 130 when a potential with respect to the electrode 130 is in a positive polarity period, a state occurs where the anionic impurities are adsorbed to the exposed portion 28*c*, so even when there is a concentration gradient of the anionic impurities, the anionic impurities are unlikely to diffuse in the pixel area E. Additionally, even when cationic impurities are released from the electrode 130 when a potential with respect to the electrode 130 is in a negative polarity period, a state occurs where the cationic impurities are adsorbed to the exposed portion 28*c*, so even when there is a concentration gradient of the cationic impurities, the cationic impurities are unlikely to diffuse in the pixel area E.

Note that, the exposed portion 28*c* can be formed by forming the organic silane compound layer 29 at an entire surface of the second alignment film 28, and then irradiating with an excimer laser or the like to remove the organic silane compound layer 29.

5. Fifth Exemplary Embodiment

Figure 13:
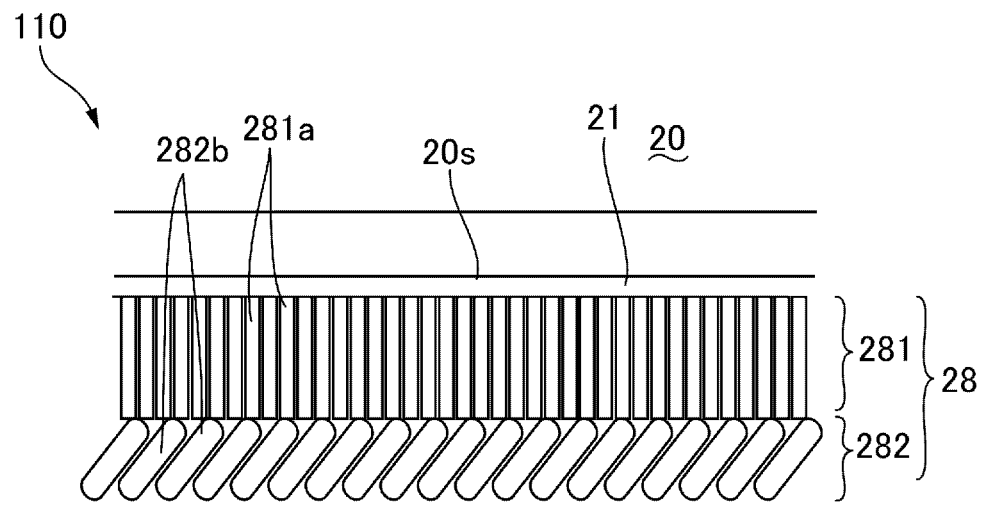
FIG. 13 is an explanatory diagram illustrating another aspect of a first alignment film and a second alignment film illustrated in FIG. 2.
Figure 13:
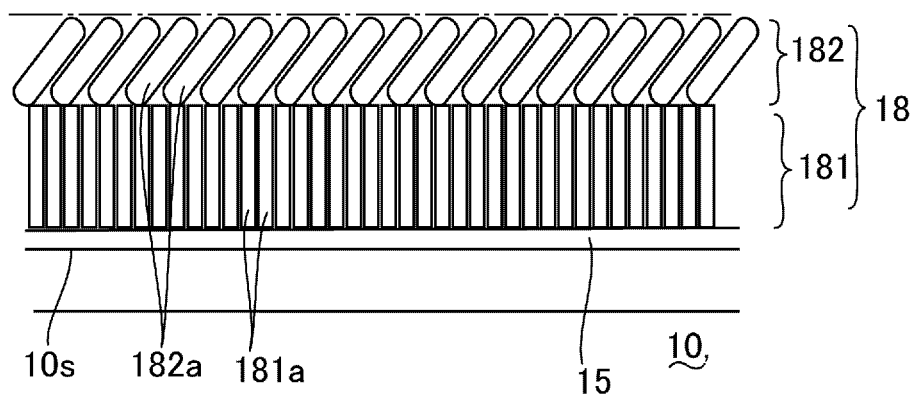

FIG. 13 is an explanatory diagram illustrating another aspect of the first alignment film 18 and the second alignment film 28 illustrated in FIG. 2. In the first exemplary embodiment and the second exemplary embodiment, the entire first alignment film 18 and second alignment film 28 are formed by diagonally vapor-deposited films. On the other hand, in the present exemplary embodiment, as illustrated in FIG. 13, the first alignment film 18 includes first inorganic films 181 in which a long axis direction of columns 181*a* is orthogonal to a substrate surface, and second inorganic film 182 covering the first inorganic film 181, the second alignment film 28 includes first inorganic films 281 in which a long axis direction of columns 281*a* is orthogonal to the substrate surface, and second inorganic film 282 covering the first inorganic film 281, and in the second inorganic films 182 and 282, long axis directions of the respective columns 182*a* and 282*a* are diagonally inclined in directions indicated by the respective arrows C1 and C2 in FIG. 1, with respect to the substrate surface.

Here, the first inorganic films 181 and 281 are vertical vapor deposition films deposited from a direction perpendicular to the substrate surface. The second inorganic film 182 and 282 are diagonally vapor-deposited films deposited from a direction inclined diagonally with respect to the substrate surface. The second inorganic films 182 and 282 are columnar crystals of silicon oxide. In the present exemplary embodiment, the second inorganic films 182 and 282 have less film thicknesses than the first inorganic films 181 and 281, respectively.

In the first alignment film 18 and the second alignment film 28 configured as described above, the first inorganic films 181 and 281 are vertical vapor deposition films, and thus less likely to be affected by a surface condition of the pixel electrode 15. Accordingly, defects are less likely to occur in the first inorganic films 181 and 281. Thus, surface roughness of the second inorganic films 182 and 282 forming surfaces in the first alignment film 18 and the second alignment film 28 respectively is small, and thus liquid crystal molecules can be appropriately aligned.

6. Other Exemplary Embodiments

The liquid crystal device 110 to which the present disclosure is applied is not limited to a liquid crystal device in a VA mode. For example, the present disclosure may be applied when the liquid crystal device 110 is a liquid crystal device in a TN (Twisted Nematic) mode or an OCB (Optical Compensated Bend) mode. In addition, the present disclosure may be applied not only to the transmissive type liquid crystal device 110, but also to a reflective type liquid crystal device.

7. Example of Mounting onto Projection-Type Display Device 100

Figure 14:
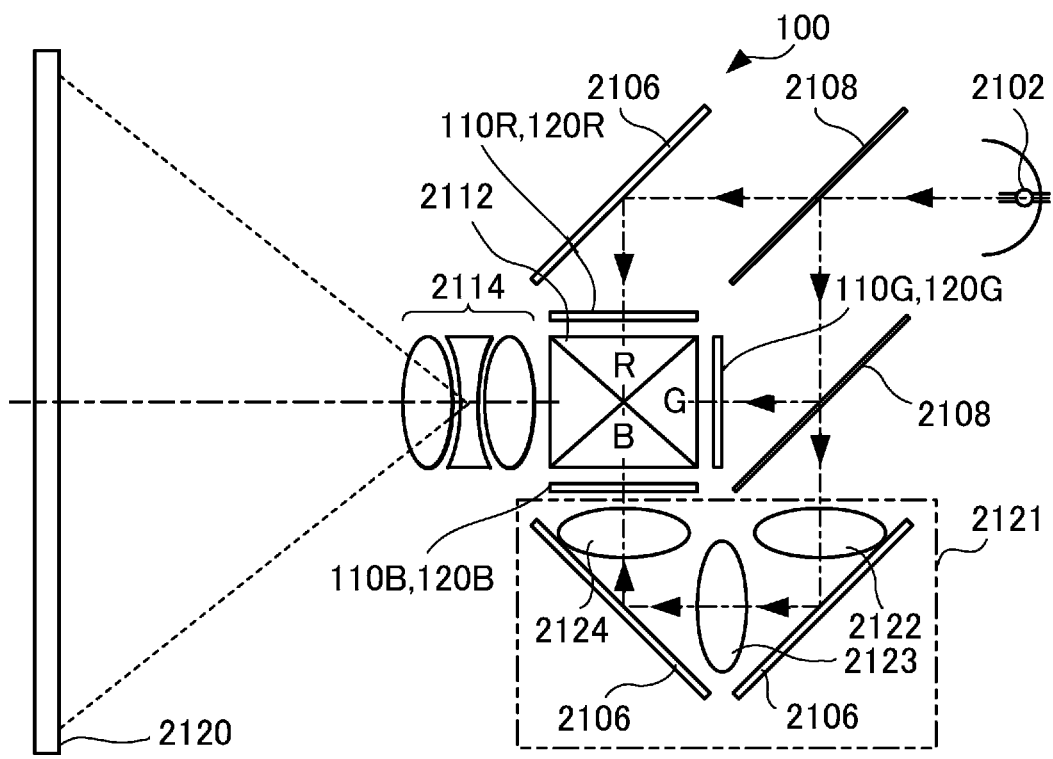
FIG. 14 is a schematic configuration diagram of a projection-type display device using a liquid crystal device to which the present disclosure is applied.

An electronic apparatus using the liquid crystal device 110 according to the above-described exemplary embodiments will be described. FIG. 14 is a schematic configuration diagram of the projection-type display device 100 using the liquid crystal device 110 to which the present disclosure is applied. In FIG. 14, an optical element such as a polarizing plate is not illustrated. The projection-type display device 100 illustrated in FIG. 14 is an example of an electronic apparatus using the liquid crystal device 110.

In the projection-type display device 100 illustrated in FIG. 14, light valves 120 each including the liquid crystal device 110 according to the above-described exemplary embodiment are provided corresponding to an R (red) color, a G (green) color, a B (blue) color. Therefore, the display device 100 includes a first liquid crystal device 110B on which light in a first wavelength range is incident, a second liquid crystal device 110G on which light in a second wavelength range having a longer wavelength than that of the first wavelength range is incident, and a third liquid crystal device 110R on which light in a third wavelength range having a longer wavelength than that of the second wavelength range is incident.

The projection-type display device 100 is provided with a lamp unit 2102 having a white light source such as a halogen lamp as a light source unit. Projection light emitted from the lamp unit 2102 is split into three primary colors of the R color, the G color, and the B color by three mirrors 2106 and two dichroic mirrors 2108 installed inside. The split projection light is guided to each of light valves 120R, 120G, and 120B corresponding to the primary colors, and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 120R, 120G, and 120B is incident on a synthetic optical system including a dichroic prism 2112 from three directions. Then, at the synthetic optical system 2112, the light of the R color and the light of the B color are reflected at 90 degrees, and the light of the G color is transmitted. Accordingly, images of the respective primary colors are synthesized in the synthetic optical system 2112, and subsequently a color image is projected on a projected member such as a screen 2120, by a projection optical system 2114.

In the projection-type display device 100 configured in this manner, for example, the liquid crystal device 110 according to the first exemplary embodiment, the second exemplary embodiment, the third exemplary embodiment, the fourth exemplary embodiment, or the fifth exemplary embodiment is used in the first liquid crystal device 110B, the second liquid crystal device 110G, and the third liquid crystal device 110R.

In addition, in the projection-type display device 100, the liquid crystal device 110 according the first exemplary embodiment, the second exemplary embodiment, the third exemplary embodiment, the fourth exemplary embodiment, or the fifth exemplary embodiment may be used in the first liquid crystal device 110B on which light having a shortest wavelength is incident, and a liquid crystal device in which an electrode according to the present disclosure is not provided may be used in the second liquid crystal device 110G and the third liquid crystal device 110R.

In addition, in the projection-type display device 100, the liquid crystal device 110 according to the first exemplary embodiment, the second exemplary embodiment, the third exemplary embodiment, the fourth exemplary embodiment, or the fifth exemplary embodiment may be used in the first liquid crystal device 110B and the second liquid crystal device 110G on which light having a relatively short wavelength is incident, and a liquid crystal device to which the present disclosure is not applied may be used in the third liquid crystal device 110R.

In addition, in the projection-type display device 100, the liquid crystal device 110 according to the fourth exemplary embodiment or the fifth exemplary embodiment may be used in the first liquid crystal device 110B on which light having a shortest wavelength is incident, and the liquid crystal device 110 according to the first exemplary embodiment or the second exemplary embodiment may be used in the second liquid crystal device 110G and the third liquid crystal device 110R.

In addition, in the projection-type display device 100, the liquid crystal device 110 according to the fourth exemplary embodiment or the fifth exemplary embodiment may be used in the first liquid crystal device 110B and the second liquid crystal device 110G on which light having a relatively short wavelength is incident, and the liquid crystal device 110 according to the first exemplary embodiment or the second exemplary embodiment may be used in the third liquid crystal device 110R.

8. Other Electronic Apparatuses

The projection-type display device 100 illustrated in FIG. 14 may be configured to use, as a light source unit, an LED light source configured to emit light in various colors, and the like to supply light in various colors emitted from the LED light source to another liquid crystal device. The liquid crystal device 110 to which the present disclosure is applied may be used in the projection-type display device 100 using a laser light source for a light source unit.

Further, an electronic apparatus including the liquid crystal device 110 to which the present disclosure is applied is not limited to the projection-type display device 100 of the above-described exemplary embodiments. For example, the liquid crystal device 110 to which the present disclosure is applied may be used in electronic apparatuses such as a projection-type head up display (HUD), a direct-view-type head mounted display (HMD), a personal computer, a digital still camera, and a liquid crystal television.

What is claimed is:

1. A liquid crystal device, comprising:
a first substrate having a pixel area;
a second substrate having a common electrode to which a common potential is applied;
a seal material provided between the first substrate and the second substrate; and
a liquid crystal layer disposed in a space surrounded by the seal material, wherein
the pixel area includes a first pixel area having a first pixel electrode to which an image signal is applied, the image signal having a potential alternately switching between a positive polarity and a negative polarity with reference to a first central potential, and, between the first pixel area and the seal material, a second pixel area having a second pixel electrode to which a first driving potential is applied, the first driving potential having a potential alternately switching between a positive polarity and a negative polarity with reference to a second central potential, the first central potential and the second central potential having a potential difference set therebetween.

2. The liquid crystal device according to claim 1, wherein the image signal and the first driving potential have the same amplitude and cycle.

3. The liquid crystal device according to claim 1, wherein a potential difference between the second central potential and the first central potential is equal to or greater than 0.2 V.

4. The liquid crystal device according to claim 3, wherein the potential difference between the second central potential and the first central potential is less than 3 V.

5. The liquid crystal device according to claim 1, wherein the second central potential is higher than the first central potential.

6. The liquid crystal device according to claim 1, wherein the first substrate includes, between the seal material and the second pixel area in plan view, an electrode to which a DC second driving potential is applied,
a polarity of the second driving potential with reference to the first central potential is equal to a polarity of the second central potential with reference to the first central potential, and
a potential difference between the second driving potential and the first central potential is greater than a potential difference between the first central potential and the second central potential.

7. The liquid crystal device according to claim 6, wherein a potential difference between the second driving potential and the second central potential is greater than the potential difference between the first central potential and the second central potential.

8. The liquid crystal device according to claim 6, wherein a maximum potential difference between the second driving potential and the second central potential is equal to or greater than 1 V and less than 3 V.

9. The liquid crystal device according to claim 1, wherein the first substrate has an electrode between the seal material and the second pixel area in plan view, the electrode is applied with an AC second driving potential, the AC second driving potential having a potential alternately switching between a positive polarity and a negative polarity with reference to the first central potential, and
in a period in which a polarity of the second driving potential with reference to the first central potential is equal to a polarity of the second central potential with reference to the first central potential, a maximum potential difference between the second driving potential and the first central potential is greater than a potential difference between the first central potential and the second central potential.

10. The liquid crystal device according to claim 9, wherein
in the period in which the polarity of the second driving potential with reference to the first central potential is equal to the polarity of the second central potential with reference to the first central potential, a maximum potential difference between the second driving potential and the second central potential is greater than the potential difference between the first central potential and the second central potential.

11. The liquid crystal device according to claim 9, wherein
a polarity inversion cycle of the second driving potential is longer than a polarity inversion cycle of the image signal.

12. The liquid crystal device according to claim 1, wherein
one electrode of the first pixel electrode, the second pixel electrode, and the common electrode is covered with an inorganic alignment film having a surface subjected to silane coupling treatment.

13. The liquid crystal device according to claim 12, wherein
the inorganic alignment film includes a first inorganic film having a column orthogonal to a substrate surface, and a second inorganic film that covers the first inorganic film and has a column inclined diagonally with respect to the substrate surface.

14. An electronic apparatus, comprising:
a first liquid crystal device on which light in a first wavelength range is incident;
a second liquid crystal device on which light in a second wavelength range having a longer wavelength than that of the first wavelength range is incident; and
a third liquid crystal device on which light in a third wavelength range having a longer wavelength than that of the second wavelength range is incident; and
a synthetic optical system configured to synthesize light in the first wavelength range emitted from the first liquid crystal device, light in the second wavelength range emitted from the second liquid crystal device, and light in the third wavelength range emitted from the third liquid crystal device, wherein
the liquid crystal device according to claim 1 is used for the first liquid crystal device.

15. An electronic apparatus, comprising:
a first liquid crystal device on which light in a first wavelength range is incident;
a second liquid crystal device on which light in a second wavelength range having a longer wavelength than that of the first wavelength range is incident; and
a third liquid crystal device on which light in a third wavelength range having a longer wavelength than that of the second wavelength range is incident; and a synthetic optical system configured to synthesize light in the first wavelength range emitted from the first liquid crystal device, light in the second wavelength range emitted from the second liquid crystal device, and light in the third wavelength range emitted from the third liquid crystal device, wherein the liquid crystal device according to claim 1 is used for each of the first liquid crystal device and the second liquid crystal device.

* * * * *